(12) United States Patent
Satoh et al.

(10) Patent No.: US 7,215,302 B2
(45) Date of Patent: May 8, 2007

(54) DISPLAY DEVICE, POSITION ADJUSTMENT PATTERN DISPLAY PROGRAM, RECORDING MEDIUM, POLARIZED GLASSES, AND METHOD OF ADJUSTING POSITION OF FILTER OF THE DISPLAY DEVICE

(75) Inventors: Seiji Satoh, Kanagawa (JP); Hidehiko Sekizawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 257 days.

(21) Appl. No.: 10/344,181

(22) PCT Filed: Jun. 5, 2002

(86) PCT No.: PCT/JP02/05557

§ 371 (c)(1),
(2), (4) Date: May 9, 2003

(87) PCT Pub. No.: WO02/101445

PCT Pub. Date: Dec. 19, 2002

(65) Prior Publication Data
US 2003/0227450 A1    Dec. 11, 2003

(30) Foreign Application Priority Data
Aug. 8, 2001   (JP) .............................. 2001-174855

(51) Int. Cl.
*G09G 5/00* (2006.01)

(52) U.S. Cl. .......................... 345/7; 348/51; 359/502; 359/559

(58) Field of Classification Search ................. 345/905, 345/6–8; 348/51; 359/502, 559; 349/15
See application file for complete search history.

(56) References Cited

U.S. PATENT DOCUMENTS

| | | | | |
|---|---|---|---|---|
| 5,963,371 A | * | 10/1999 | Needham et al. ............ 359/464 |
| 5,966,167 A | * | 10/1999 | Nose et al. .................... 348/59 |
| 6,377,295 B1 | * | 4/2002 | Woodgate et al. ............ 348/59 |

FOREIGN PATENT DOCUMENTS

JP      10-206796      8/1998

* cited by examiner

*Primary Examiner*—Richard Hjerpe
*Assistant Examiner*—Duc Q Dinh
(74) *Attorney, Agent, or Firm*—Sonnenschein Nath & Rosenthal LLP

(57) ABSTRACT

Even if a divided wavelength plate filter is mounted, it is possible to reliably display a three-dimensional image or perform a displaying operation on from one screen to a plurality of screens. In a display device, the relative positions of an image display section and a divided wavelength plate filter for rotating polarized light from image information at a first segment in a direction that is different from the direction of polarized light from image information at a second segment can be adjusted. At the time of positional adjustment, the display device displays a position adjustment pattern (112) having colors, figures, characters, symbols, diagrams, or designs, or combinations thereof which differ from each other depending on the segment.

15 Claims, 25 Drawing Sheets

DISPLAY DEVICE, POSITION ADJUSTMENT PATTERN DISPLAY PROGRAM, RECORDING MEDIUM, POLARIZED GLASSES, AND METHOD OF ADJUSTING POSITION OF FILTER OF THE DISPLAY DEVICE

BACKGROUND OF THE INVENTION

The present invention relates to a display device which allows an image containing parallax information to be viewed three-dimensionally or which can perform a displaying operation on from one screen to a plurality of screens, a position adjustment pattern display program used in such a display device, a recording medium, polarized glasses, and a method of adjusting the position of a filter of the display device. More particularly, the present invention relates to a filter position adjustment pattern for displaying an optimal three-dimensional image or for performing a displaying operation on from one screen to a plurality of screens when a divided wavelength plate filter is mounted, and a method of adjusting the position of the filter.

Hitherto, various attempts have been made to provide technologies for presenting images three-dimensionally. In many fields, such as photography, movies, and television, methods for displaying images three-dimensionally have been studied and put into practical use. Methods for displaying images three-dimensionally are broadly divided into a method using glasses and a method not using glasses. In both of these methods, an image having binocular parallax is input to the left and right eyes of a viewer to allow the viewer to view three-dimensional images. Typical examples of the method using glasses are what are called an anaglyph method using red, blue glasses and a method using polarized glasses. Color separation methods, such as the anaglyph method, have many qualitative problems including a difficulty in color presentation and reduction in the field of view. The method using polarized glasses has problems such as the necessity of generally using two projection devices. In recent years, however, a method which allows a three-dimensional display using one direct-viewing display device has been proposed.

FIG. 24 schematically shows a three-dimensional image display device making use of the method using polarized glasses. A three-dimensional image display device 200 comprises a liquid crystal panel 201 and a divided wavelength plate filter 202 mounted to the liquid crystal panel 201. The liquid crystal panel 201 has a pair of transparent supporting substrates 204 and 206, which are formed between a pair of polarizing plates 203 and 207, and pixel liquid crystal sections 205 each having RGB pixels being formed between the pair of transparent supporting substrates 204 and 206. The divided wavelength plate filter 202 is provided at a surface of the liquid crystal panel 201, and has a structure in which separated wavelength plates 208 are disposed at, for example, every other line on one surface of a transparent protective substrate 209. The divided wavelength plate filter 202 is also called a μ-Pol or a micropolarizer.

In the three-dimensional image display device 200 having such a structure, linearly polarized lights from an even-numbered line and an odd-numbered line on a display screen are converted into lights that are orthogonal to each other by rotating the direction of linearly polarized light that has exited from the liquid crystal panel 201. In other words, the linearly polarized light from the liquid crystal panel exits unchanged from an even-numbered line, whereas, the linearly polarized light from the liquid crystal panel is converted into a linearly polarized light which is orthogonal to the linearly polarized light exiting from the even-numbered line by the divided wavelength plates 208 and exits from an odd-numbered line. By viewing the lights from the display device with glasses 210 in which polarization directions are orthogonal to each other, a right-eye image light is incident upon the right eye, and a left-eye image light is incident upon the left eye. By viewing the images with the glasses 210, it is possible to view full-color three-dimensional images without any flickering.

A three-dimensional display device which does not require a viewer to wear glasses as a result of effectively making use of a wavelength plate filter such as that described above has been proposed (see Japanese Unexamined Patent Application Publication No. 10-63199). In addition, the present inventor et al. have proposed a display device which performs a displaying operation on from one display screen to a plurality of screens as an example of a display device which effectively makes use of the above-described wavelength plate filter (see Japanese Unexamined Patent Application Publication No. 11-249593), wherein a system takes out predetermined original images by an image separation mechanism after displaying a combination of two or more images on one display surface which potentially has an image separation mechanism.

When the divided wavelength plate filter 202 is mounted in a display device comprising the liquid crystal panel 201, etc., the divided wavelength plate filter 202 must be reliably secured to locations corresponding to predetermined areas (pixel positions) of the display device. However, this is not easy to achieve, thereby giving rise to the following problems.

The first problem occurs when mounting the divided wavelength plate filter. Since the above-described display method uses the display surface by dividing it in accordance with predetermined areas, forming the divided areas as thinly as possible in the form of a nest is effective in providing resolution. In addition, since the pixels of the display surface having higher resolution are becoming more minute, a high-definition panel can be obtained, but it is very difficult to precisely secure a corresponding high-definition divided wavelength plate filter, which is produced in a separate process, in correspondence with the pixels of the predetermined areas.

Even in the case where the divided wavelength plate filter is successfully precisely mounted, since the filter is generally secured using resin or the like, the position of the divided wavelength plate filter tends to become shifted during the period in which it is being secured until the resin hardens even if the position of the divided wavelength plate filter has been adjusted once. In addition, various factors, such as heat and vibration during conveyance of the divided wavelength plate filter, often cause the position of the divided wavelength plate filter to be shifted. Further, due to manufacturing problems, in order to maintain the precision of the predetermined areas, a glass substrate is, in general, often used for the divided wavelength plate filter, so that its position is, in particular, shifted by its own weight. Still further, various durability conditions, such as deterioration of the fixing agent, may cause the divided wavelength plate filter to be shifted, so that, when the hardened resin is shifted, it is very difficult to correct the position of the divided wavelength plate filter afterwards. Therefore, the relatively expensive display panel becomes utterly useless.

In the three-dimensional image display method, the optimal position of disposing the filter is determined by the positional height of the eyes of the viewer viewing an image.

Therefore, the position where the filter is previously secured is not necessarily the optimal position when an image is being viewed. FIG. 25 shows this situation. A display device 220 shown in FIG. 25 comprises a pixel section 223, which is interposed between transparent supporting substrates 221 and 222, and a divided wavelength plate filter 225. In FIG. 25, the optimal position of disposing the wavelength plate filter for a viewer at a viewing position α corresponds to the position of the wavelength plate filter indicated by solid lines, whereas the optimal position of the wavelength plate filter for a viewer at a viewing position β corresponds to the position of the wavelength plate filter similarly indicated by dotted lines. In this way, as is clear from FIG. 25, the optimal position of disposing the filter depends upon, for example, the positional height of the eyes of the viewer viewing an image as well as, for example, the angle of the monitor or the liquid crystal panel, so that the position where the divided wavelength plate filter is previously secured does not necessarily correspond to the optimal position of disposing the divided wavelength plate filter when an image is being viewed.

By any of the aforementioned factors, when the divided wavelength plate filter is shifted by a few percent to tens of percent (tens of μm in the example above) with respect to the pixels, the shift appears large as crosstalk between the pixels. When the divided wavelength plate filter is properly set, a light ray from the corresponding pixel always passes through the corresponding wavelength plate area, so that light rays from the pixels other than the corresponding pixel do not pass through the corresponding wavelength plate area. However, when the divided wavelength plate filter is tilted, even if the divided wavelength plate filter is only slightly shifted by an amount of the order of a few percent to tens of percent with respect to the pixel, and by an absolute value of, for example, of the order of 50 μm, the amount of shift in the vertical direction becomes large at both ends of the divided wavelength plate filter, so that there may be a portion of the light ray from the corresponding pixel that does not pass through the corresponding wavelength plate area. As a result, crosstalk between images occurs, so that proper three-dimensional images cannot be displayed.

Hitherto, in the mounting of the wavelength plate filter, a composite image for three-dimensional display similar to the usual composite image has been displayed on a screen, and a viewer wears polarized glasses and views the composite image to see whether or not it actually appears as a three-dimensional image in order to determine the position of the divided wavelength plate filter. However, the standard for determining whether or not the image appears as a three-dimensional image is very unclear, so that there is a demand for making it possible to position the divided wavelength plate filter using a more accurate method.

Accordingly, in view of the aforementioned technological problems, it is an object of the present invention to provide a display device which allows an image containing parallax information to be reliably viewed three-dimensionally even when a divided wavelength plate filter is mounted, or a display device which can reliably perform a displaying operation on from one display screen to a plurality of display screens, polarized glasses used in such display devices, and a method of adjusting the position of the filter of the display device.

SUMMARY OF THE INVENTION

To overcome the aforementioned problems, the present invention provides a display device which comprises an image display section for displaying image information at a first segment and a second segment, and which is used along with a divided wavelength plate filter for rotating polarized light from the image information at the first segment in a direction that is different from the direction of polarized light from the image information at the second segment, wherein the display device displays a position adjustment pattern having colors, figures, characters, symbols, diagrams, or designs or combinations thereof which differ from each other depending on the segment when the relative positions of the image display section and the divided wavelength plate filter is to be adjusted.

According to an example of the display device of the present invention, the divided wavelength plate filter is divided at every line and is controlled so that the polarization directions differ from each other depending on the line, with the direction in which the divided wavelength plate filter is divided at each line being either horizontal or vertical. The divided wavelength plate filter comprises half-wavelength plates to be located corresponding to the lines of the first segment or the lines of the second segment. When the display device comprises a divided wavelength plate filter, the display device comprises the divided wavelength plate filter and position adjusting means, the filter comprising a frame and being disposed close to the first and second segments of the image display section for rotating the polarized light from the image information at the first segment in a direction that is different from the direction of the polarized light from the image information at the second segment; and the position adjusting means acting upon the frame of the divided wavelength plate filter for adjusting the relative positions of the image display section and the divided wavelength plate filter.

The divided wavelength plate filter is an area for changing the polarization direction of light from the image display section in accordance with parallax. Light that has passed through the divided wavelength plate filter is controlled so that the polarization direction of polarized light containing the image information at the first segment and the polarization direction of polarized light containing the image information at the second segment are different from each other, desirably, so that the polarization directions are orthogonal to each other. The divided wavelength plate filter must be reliably secured to the locations corresponding to predetermined areas of the display device, so that it is necessary to precisely adjust the relative positions of the image display section and the divided wavelength plate filter. In the present invention, the position adjustment pattern is a pattern for outputting pieces of visual information at the first segment and at the second segment that differ from each other depending on the segment. For the different pieces of visual information, colors, figures, characters, symbols, diagrams, designs, or combinations thereof are used. Even if the display device performs a displaying operation so that either a position information pattern at the first segment or a position information pattern at the second segment is only detected, a state where the other position information pattern is detected indicates that the positional adjustment is not completed. Therefore, by making positional adjustments so that the position information pattern at either one of the segments is only detected, the display device reliably displays an image three dimensionally or reliably performs a displaying operation on from one display screen to a plurality of display screens.

According to the present invention, there is provided a position adjustment pattern display program for displaying a position adjustment pattern for adjusting the position of a divided wavelength plate filter for rotating polarized light from image information at a first segment in a direction that is different from the direction of polarized light from image information at a second segment. The position adjustment pattern display program comprises a procedure for displaying the position adjustment pattern having colors, figures, characters, symbols, diagrams, or designs or combinations thereof which differ from each other depending on the segment.

The position adjustment pattern display program of the present invention comprises a procedure for displaying the position adjustment pattern having colors, figures, characters, symbols, diagrams, or designs or combinations thereof which differ from each other depending on the segment. Therefore, pieces of visual information at the first segment and the second segment that differ from each other depending on the segment are obtained, so that, by making positional adjustments so that the position information pattern at either segment is only detected, the display device reliably displays an image three dimensionally or reliably performs a displaying operation on from one display screen to a plurality of display screens.

According to the present invention, there is provided a recording medium which is capable of being subjected to a reading operation by a display device, wherein, in order to adjust the position of a divided wavelength plate filter for rotating polarized light from image information at a first segment in a direction that is different from the direction of polarized light from image information at a second segment, the recording medium stores a position adjustment pattern display program comprising a procedure for displaying a position adjustment pattern having colors, figures, characters, symbols, diagrams, or designs or combinations thereof which differ from each other depending on the segment.

The position adjustment pattern display program can be stored on a desired recording medium, so that, when the program is stored on such a recording medium, it is possible to move the divided wavelength plate filter to adjust its position by reading out the program stored on the recording medium when necessary.

According to the present invention, there are provided polarized glasses for viewing a display image through a divided wavelength plate filter for rotating polarized light from image information at a first segment of an image display section in a direction that is different from the direction of polarized light from image information at a second segment of the image display section, wherein the polarization directions of polarizing filters formed at lenses of both eyes are the same.

According to the polarized glasses of the present invention, since the directions of polarization of the polarizing filters, formed at the lenses of both eyes, are the same, the user can view either the polarized light from the image information at the first segment or the polarized light from the image information at the second segment. Therefore, when adjusting the position of the divided wavelength plate filter, only one of the position information patterns is subjected to detection. Consequently, by making an adjustment so that the position information pattern at either segment is only detected, the position of the divided wavelength plate filter can be reliably adjusted.

According to the present invention, there is provided a method of adjusting the position of a filter of a display device which comprises an image display section for displaying image information at a first segment and a second segment, wherein a position adjustment pattern having colors, figures, characters, symbols, diagrams, or designs or combinations thereof which differ from each other depending on the segment is displayed on the image display section through a divided wavelength plate filter for rotating polarized light from image information at the first segment of the image display section in a direction that is different from the direction of polarized light from image information at the second segment of the image display section; the positional shift between the position adjustment pattern and the divided wavelength plate filter is detected in accordance with the state of the position adjustment pattern through the divided wavelength plate filter; and the relative positions of the image display section and the divided wavelength plate filter are adjusted in order to reduce the detected positional shift.

By displaying the adjustment pattern on the display device, the position of the filter, which cannot not be easily adjusted in the related technologies, can be easily adjusted, so that the viewer can actually view an optimal image with the filter being positioned at the optimal position. When the method not using glasses is used or in the method for performing a displaying operation on a plurality of screens, an optimal image can be similarly viewed.

DETAILED DESCRIPTION OF THE PRESENTLY PREFERRED EMBODIMENTS

Hereunder, a description of embodiments of the present invention will be given with reference to the drawings. In the embodiments, three-dimensional image display devices which display image information including parallax information will be mainly described. By a similar structure, a displaying operation can be performed on from one display screen to a plurality of display screens, so that a display device which performs such a displaying operation can have a similar structure.

Figure 1:
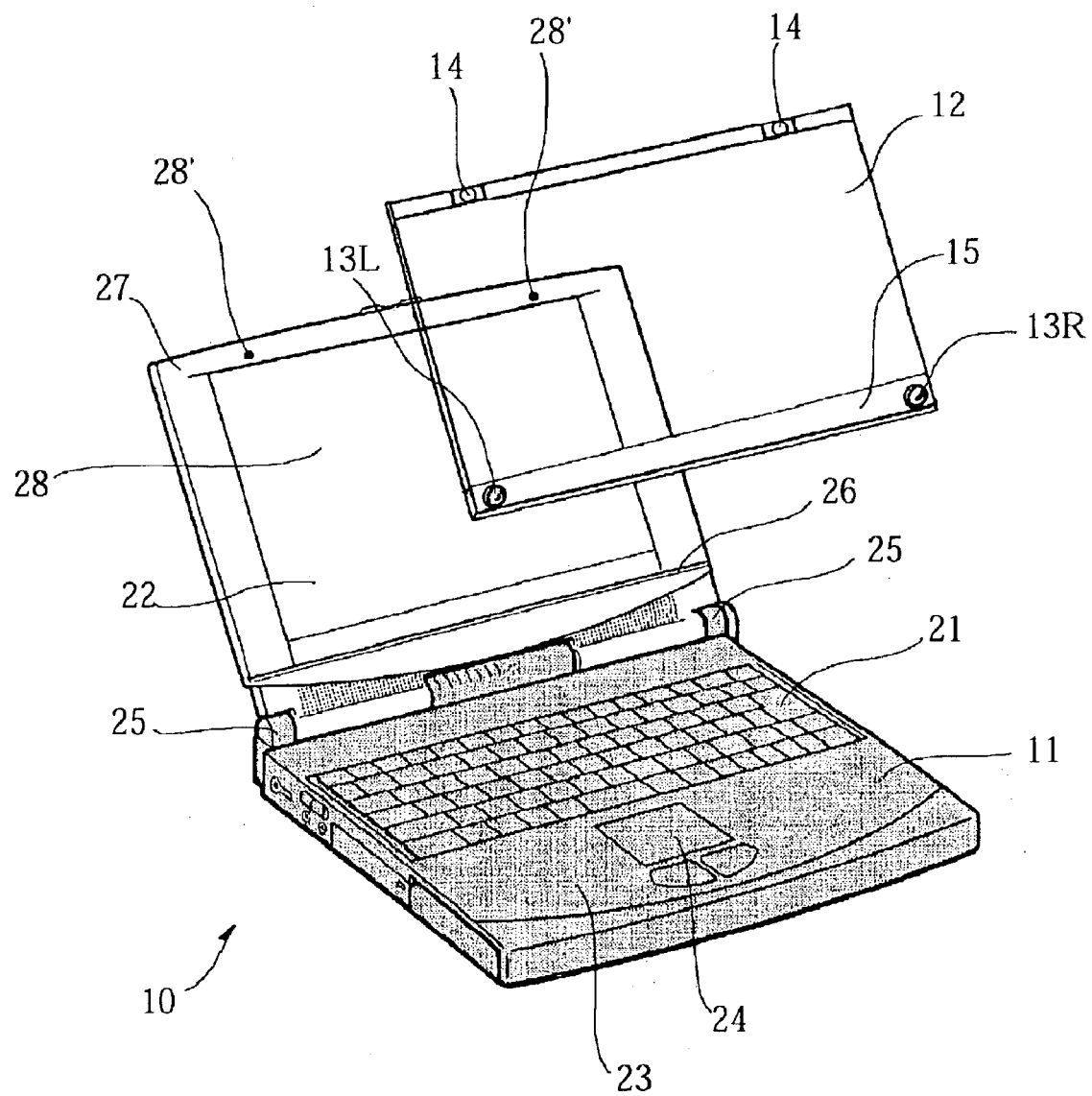
FIG. 1 is a perspective view of a three-dimensional image display device of an embodiment of the present invention.

The general structure of a three-dimensional image display device 10 of an embodiment of the present invention is shown in FIG. 1. The three-dimensional image display device 10 of the embodiment comprises a notebook computer 11, a divided wavelength plate filter 12 mountable to the notebook computer 11, a pair of left and right adjusting screws (a right adjusting knob 13R and a left adjusting knob 13L) serving as position adjusting means integrally mounted to the divided wavelength plate filter 12.

The notebook computer 11 has a liquid crystal panel 22 having a folded structure. An image containing parallax information can be displayed from the liquid crystal panel 22. The liquid crystal panel 22 itself is an ordinary liquid crystal display section of the notebook computer 11 as described later, so that, for example, when an application for displaying a three-dimensional image is not open, it can display an ordinary image (a moving image or a still image).

A keyboard 21, comprising alphanumeric character keys, hiragana character keys, katakana character keys, and various control keys, is formed at a side opposing the liquid crystal panel 22. A palm rest 23 is provided continuously with the keyboard 21 and in front of a user. A pointer pad 24 is formed at substantially the center portion of the palm rest 23. The keyboard 21, etc., are connected to the liquid crystal panel 22 through hinges 25 and 25, and the liquid crystal panel 22 can rotate with the hinges 25 and 25 as centers. Therefore, a viewer of a three-dimensional image can control the angle of the liquid crystal panel 22 with the hinges 25 and 25 as rotational centers. A position adjustment pattern display program is stored in a hard disk of the notebook computer 11. By reading the program into a CPU and running the program, a position adjustment pattern is displayed on the liquid crystal panel 22.

A supporting frame 27, formed of synthetic resin, for holding an image display section is provided around the liquid crystal panel 22. A liquid crystal display section 28 of the liquid crystal panel 22 is formed so as to be held by the supporting frame 27. A rib 26, which is a portion of the supporting frame 27 formed in the form of a rib, is provided below the liquid crystal display section 28. The rib 26 is protruded for holding the bottom portion of the divided wavelength plate filter 12 by an amount not hindering the folding of the liquid crystal panel 22 and allowing the bottom portion of the divided wavelength plate filter 12 to be sufficiently retained.

As described later, the divided wavelength plate filter 12 is a polarized light control section having strip-shaped half-wavelength plates disposed at every other horizontal line of pixels. In particular, a horizontal holder 15, formed of metal or synthetic resin and having the required rigidity, is disposed at the bottom portion of the divided wavelength plate filter 12. The left adjusting knob 13L and the right adjusting knob 13R forming part of the position adjusting means are provided near both ends of the horizontal holder 15. A pair of mounting screws 14 and 14 are provided on the top end of the divided wavelength plate filter 12. When the divided wavelength plate filter 12 is mounted, the mounting screws 14 and 14 are inserted into holes 28', formed in the supporting frame 27 disposed around the liquid crystal panel 22, through holes (not shown) that are provided in the top end of the divided wavelength plate filter 12.

The three-dimensional image display device 10 of the embodiment comprises the position adjusting means, such as the left adjusting knob 13L and the right adjusting knob 13R, and makes it possible to rotationally control the divided wavelength plate filter 12 including fine adjustments of the position thereof in the direction of extension of the strip-shaped divided wavelength plates of the divided wavelength plate filter 12, that is, the horizontal direction, and the vertical direction. Therefore, an optimal image is displayed.

Figure 2A:
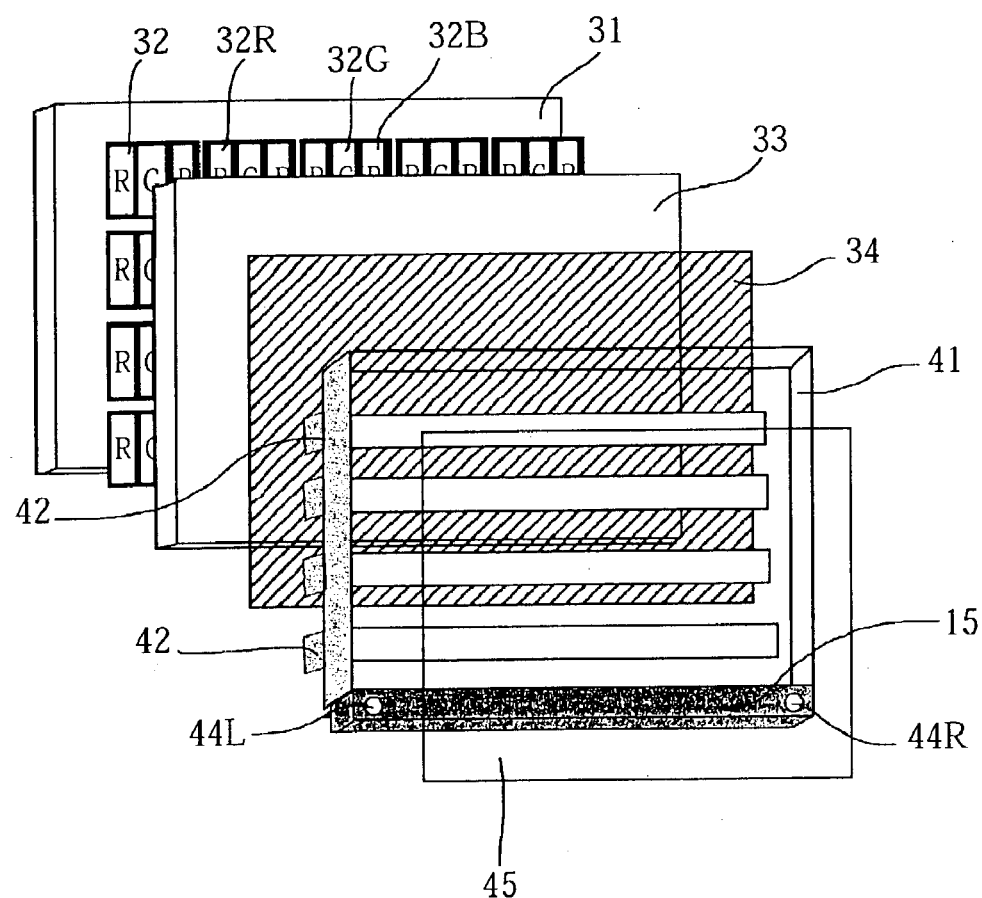
FIGS. 2A and 2B are exploded schematic views of the structure of pixel sections and a divided wavelength plate filter of the three-dimensional image display device of the embodiment of the present invention.
Figure 2B:
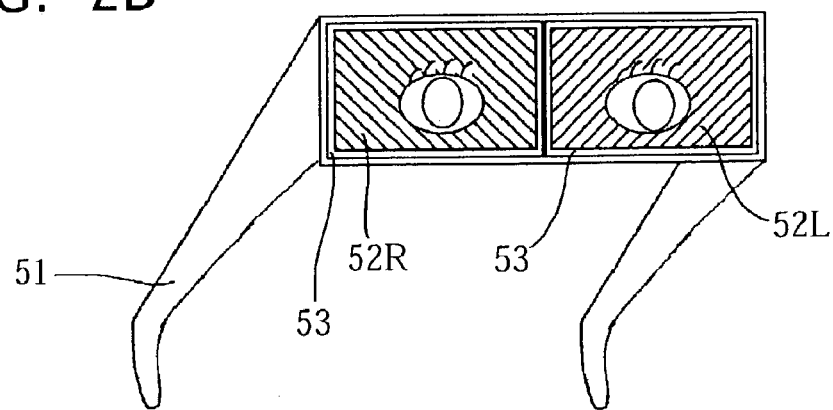

FIGS. 2A and 2B are exploded perspective views for illustrating the structure of the three-dimensional image display device of the embodiment. The structure of the liquid crystal panel side and the structure of the divided wavelength plate filter are combined to allow display of a three-dimensional image. In the structure of the liquid crystal panel side, liquid crystal pixel sections 32 are each disposed between a pair of transparent supporting substrates 31 and 33, and comprise a combination of a red pixel section 32R, a green pixel section 32G, and a blue pixel section 32B, with these pixel sections of the three colors being disposed in a matrix. Each pixel section 32 has, for example, an active matrix structure or a simple matrix structure, which is subjected to a required electrical wiring, and displays image information containing parallax information when displaying a three-dimensional image. Although the embodiment is described taking a liquid crystal panel as an image display section, the image display section of the three-dimensional image display device of the present invention may be various other types of image display sections, such as that comprising a light-emitting element array display, an organic electroluminescence display, a cathode ray tube, or a plasma display. The divided wavelength plate filter can be operated by a combination of the various kinds of image displays.

A polarizing plate 34 is disposed at the viewer side of the transparent supporting substrate 33. Light that has passed through the polarizing plate 34 becomes linearly polarized light, and the linearly polarized light reaches the divided wavelength plate filter. The divided wavelength plate filter has separated strip-shaped wavelength plates 42 at one side of a transparent supporting substrate 41 functioning as a frame and formed of glass or the like, that is, at the liquid crystal panel side of the transparent supporting substrate 41 in the embodiment. The separated wavelength plates 42 extend so that their longitudinal directions are horizontal, with the widths of the strips being about the same as the pixel pitch of the liquid crystal pixel sections 32. The number of separated wavelength plates 42 is half the number of pixels of the liquid crystal pixel sections 32 in the vertical direction.

The separated strip-shaped wavelength plates 42 are formed at every other line at the pixel pitch of the liquid crystal pixel sections 32. Therefore, by passing either a three-dimensional image for the right eye or a three-dimensional image for the left eye through the separated wavelength plates 42, the polarization direction of the image that is transmitted is rotated 90 degrees, so that the three-dimensional image that does not pass the separated wavelength plates 42 exit without its polarization direction being rotated. Although, in the embodiment, the separated wavelength plates 42 are formed so as to extend horizontally at every other line, the separated wavelength plates 42 may be formed so that the polarization directions of the three-dimensional image for the right eye and the three-dimensional image for the left eye are different for respective lines. The direction of extension of the separated wavelength plates 42 is not limited to being horizontal, so that it may be vertical or oblique. In addition, the separated wavelength plates 42 do not have to be formed at every line, so that they may be formed at every area (for example, in Faris, U.S. Pat. No. 5,327,285). Although, in the embodiment, the separated wavelength plates 42 are formed on the surface of the transparent supporting substrate 41 at the side of the liquid crystal panel 41, they may be formed at the viewer side of the transparent supporting substrate 41.

The horizontal holder 15 is mounted to the bottom portion of the transparent supporting substrate 41 serving as a frame, and, as described later, threaded holes 44L and 44R having the position adjusting means, such as the left adjusting knob 13L and the right adjusting knob 13R, mounted thereto are formed in portions of both ends of the horizontal holder 15. This adjusting mechanism will be described later.

To display three-dimensional images, the polarization directions are controlled so that they are different with each line. When light has passed through the separated wavelength plates 42, the light becomes a combination of two types of linearly polarized lights that are orthogonal to each other. The viewer selectively receives the three-dimensional image for the right eye and the three-dimensional image for the left eye with both eyes using polarized glasses 51 shown in FIG. 2(B). Lenses 52R and 52L of the glasses are polarizing filters, respectively. When their angles do not match the angles of the linearly polarized lights, it becomes difficult to see the three-dimensional images. To overcome this problem in the present invention, a ¼ wavelength plate 45 is further formed at the outer side of the divided wavelength plate filter. It converts the linearly polarized lights into circularly polarized lights. By also bonding a ¼ wavelength plate 53 to a surface of the polarized glasses 51, the circularly polarized lights are converted back to linearly polarized lights and the converted lights pass through the polarized glasses 51. In this way, by providing the pair of ¼ wavelength plates 45 and 53, three-dimensional images can be reliably viewed even if the polarization directions are slightly shifted.

Figure 3:
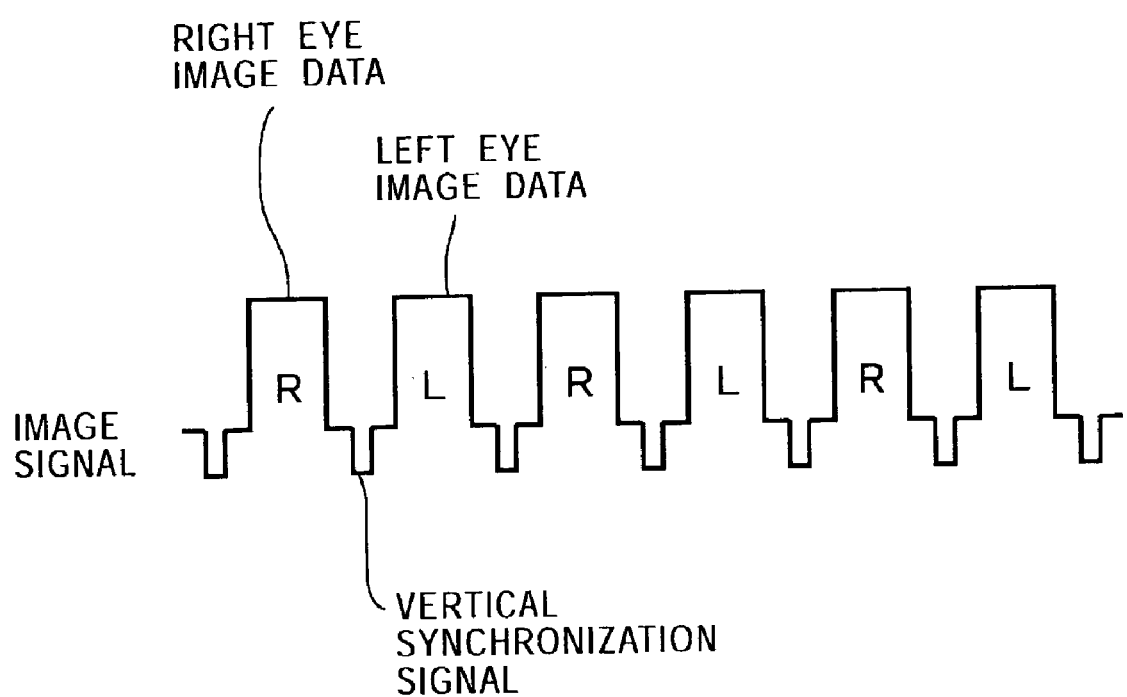
FIG. 3 shows a waveform of an example of an image signal used in the three-dimensional image display device of the embodiment of the present invention.

The image information in the three-dimensional image display device of the embodiment will be simply described with reference to FIGS. 3 and 4. In the three-dimensional image display device of the embodiment, an image signal such as that shown in FIG. 3 is used. In other words, during a horizontal scanning period which is divided by vertical synchronization signal pulses, image data for the right eye and image data for the left eye are alternately sent with every other line.

Figure 4:
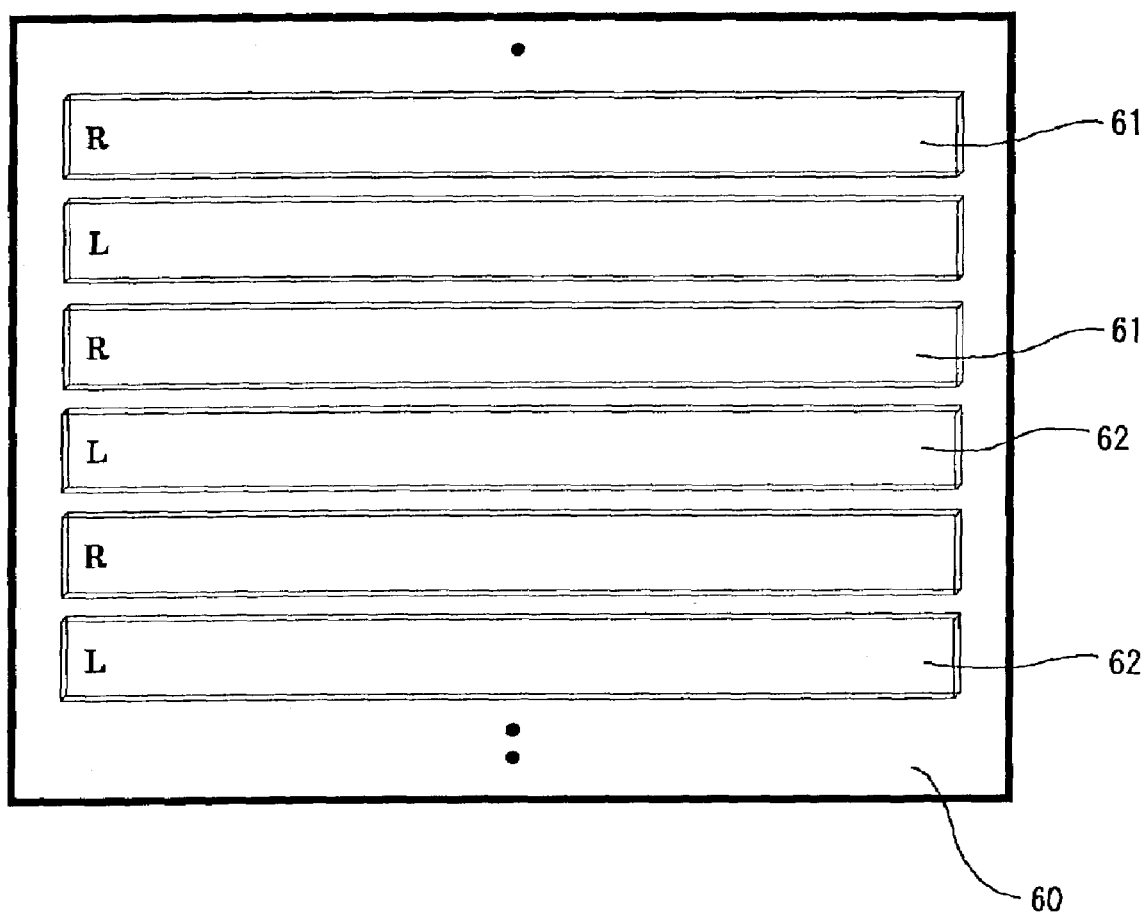
FIG. 4 is a schematic view of image patterns in the three-dimensional image display device of the embodiment of the present invention.

FIG. 4 shows the segments of the image data displayed on an image display section 60. As mentioned above, in accordance with the right-eye image data R and the left-eye image data L that are alternately sent with every other line in FIG. 3, first segments 61 for the right eye and second segments 62 for the left eye are alternately arranged at every other line. Therefore, when a pixel line of the liquid crystal panel is one where one piece of image data R for the right eye is displayed, the next pixel line is one which displays one piece of image data L for the left eye. Below this line, the first segments 61 and the second segments 62 are repeatedly alternately disposed at every other line, so that, as a whole, three-dimensional images are displayed.

Figure 5:
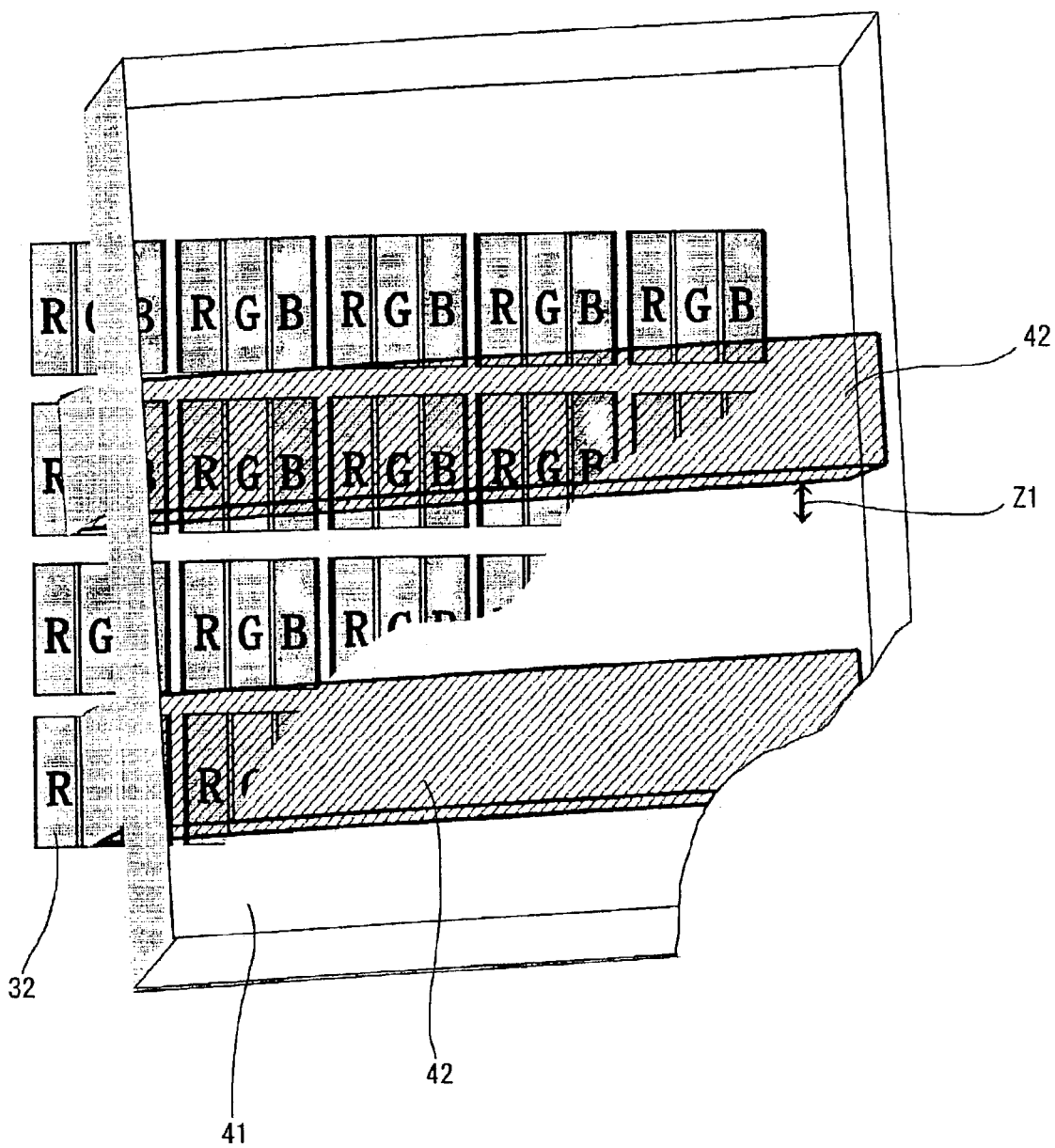
FIG. 5 is a perspective view showing a state prior to positional adjustment in the three-dimensional image display device of the embodiment of the present invention.

By mounting the divided wavelength plate filter to, for example, an ordinary liquid crystal panel, three-dimensional images can be easily viewed. However, when the position of the divided wavelength plate filter and position of the pixel sections of the display device are not properly adjusted with respect to each other, the separated wavelength plates 42 and the pixel sections 32 of the display device are typically in the relationship shown in FIG. 5. Even if the divided wavelength plate filter having the separated wavelength plates 42 formed thereat are slightly tilted, when a vertical shift amount $z1$ is a few percent to tens of percent of the pixels, and the absolute value of this shift is only, for example, of the order of 50 μm when the pixels are 250 μm, there are some light rays from the actual corresponding pixels that do not pass through the predetermined separated wavelength plates 42, so that crosstalk between the images occurs.

Figure 6:
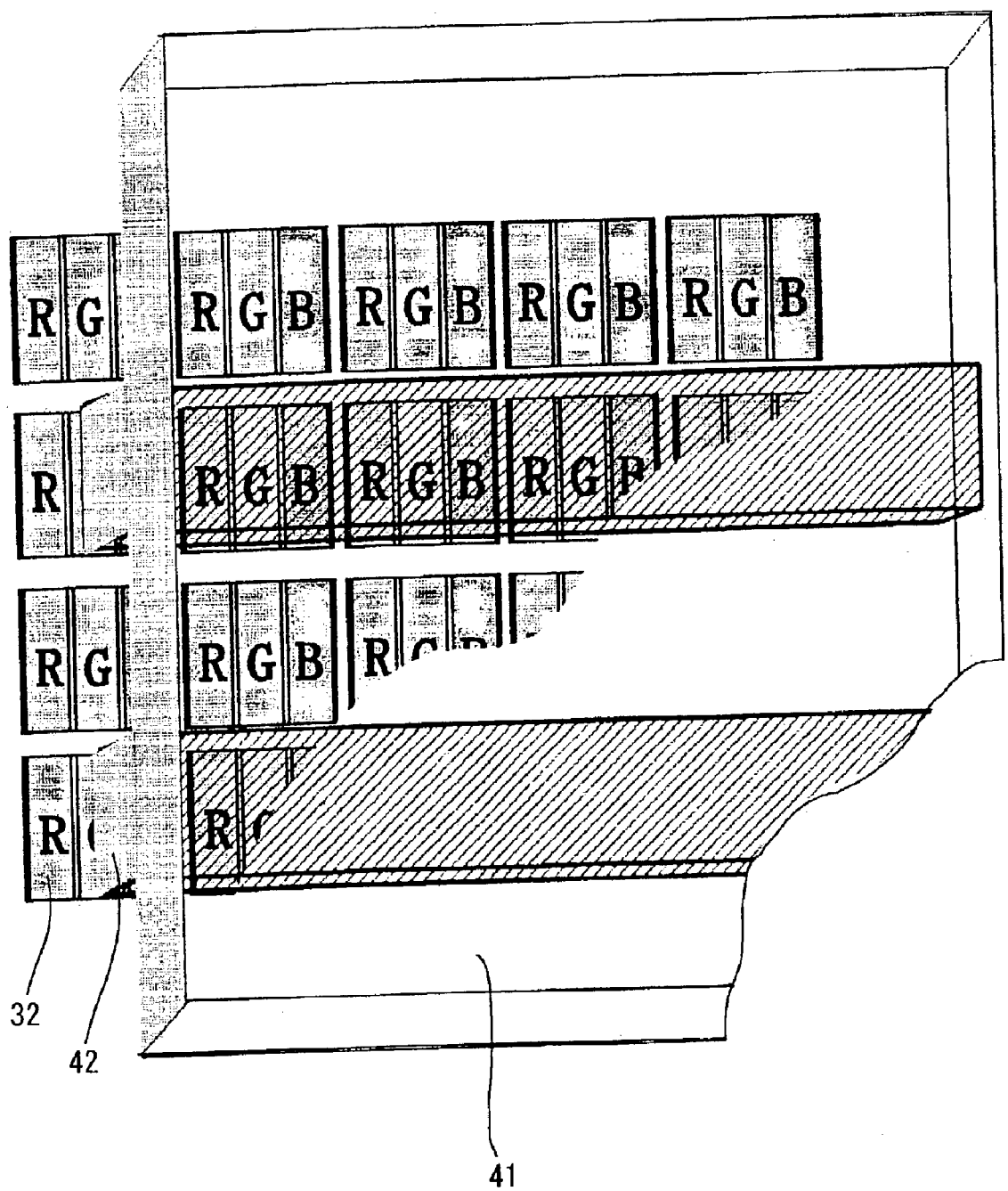
FIG. 6 is a perspective view showing a state after the positional adjustment in the three-dimensional image display device of the embodiment of the present invention.

Such crosstalk needs to be restricted in order to display optimal three-dimensional images, so that it is necessary to perform positional adjustment. FIG. 6 shows a situation where the pixel sections 32 and the separated wavelength plates 42 are properly positioned by positional adjustment. As shown in FIG. 6, the separated strip-shaped wavelength plates 42 are disposed so that they exactly overlap the respective pixel lines of the pixel sections 32 of the display device. Light rays from the pixel sections 32 corresponding to the separated wavelength plates 42 unfailingly pass through the respective separated wavelength plates 42, so that light rays from pixels other than the pixels of the respective pixel sections do not pass through areas within the separated wavelength plates 42. Therefore, crosstalk does not occur, so that proper three-dimensional images are displayed.

Here, a description of the position adjustment operation will be given with reference to FIGS. 7 to 11. The structure of a device which can achieve the position adjustment operation will be given in detail after describing the position adjustment operation. As mentioned above, in the three-dimensional display device of the embodiment, the divided wavelength plate filter 12 is formed at a surface of the liquid crystal panel 22, the horizontal holder 15 is provided at the bottom portion of the divided wavelength plate filter 12, and the left adjusting knob 13L and the right adjusting knob 13R are mounted as position adjusting means to both ends of the horizontal holder 15.

Figure 7:
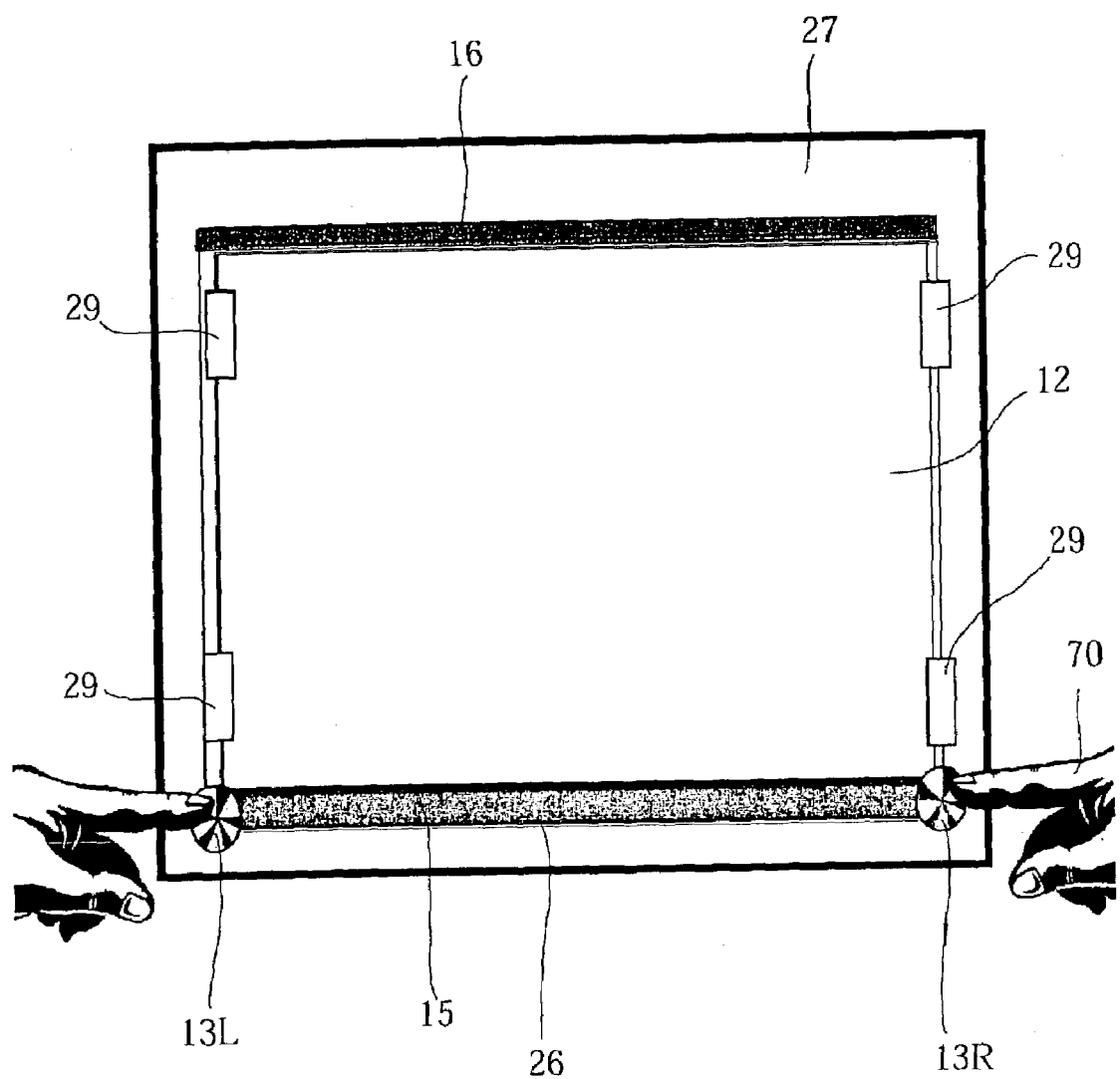
FIG. 7 is a schematic view for illustrating fine adjustment of the position of the divided wavelength plate filter of the three-dimensional image display device of the embodiment of the present invention.

As shown in FIG. 7, by operating the left adjusting knob 13L and the right adjusting knob 13R, shown in exaggerated form, with, for example, one's fingers 70, the positions of the filter wavelength plates in the height direction can be easily and reliably adjusted while viewing the state of the display screen, which could not be done conventionally. By rotating the outer peripheral portions of the adjusting knobs 13L and 13R with the fingertips, the position of the divided wavelength plate filter 12 can be finely adjusted in the vertical direction, which is the height direction. In other words, when the left adjusting knob 13L and the right adjusting knob 13R are both similarly operated at the same time, the position of the divided wavelength plate filter 12 is finely adjusted in the vertical direction, which is the height direction, because the left adjusting knob 13L and the right adjusting knob 13R have substantially the same structure. When either the left adjusting knob 13L or the right adjusting knob 13R is operated, only the side where the operated adjusting knob 13L or 13R is disposed is finely adjusted. This means that the divided wavelength plate filter 12 is positioned while being rotated relative to the image display section.

In finely adjusting the position, as described below, for example, an adjustment display pattern is displayed. By using the adjustment display pattern, the position of the divided wavelength plate filter 12 can be adjusted while the viewer views the image display section. From this viewpoint, in the three-dimensional display device of the embodiment, the divided wavelength plate filter 12 can be reliably set at the optimal position, and whether or not it has been set at the optimal position can be confirmed in real time, so that it is possible to separately display the images without crosstalk.

Figure 8:
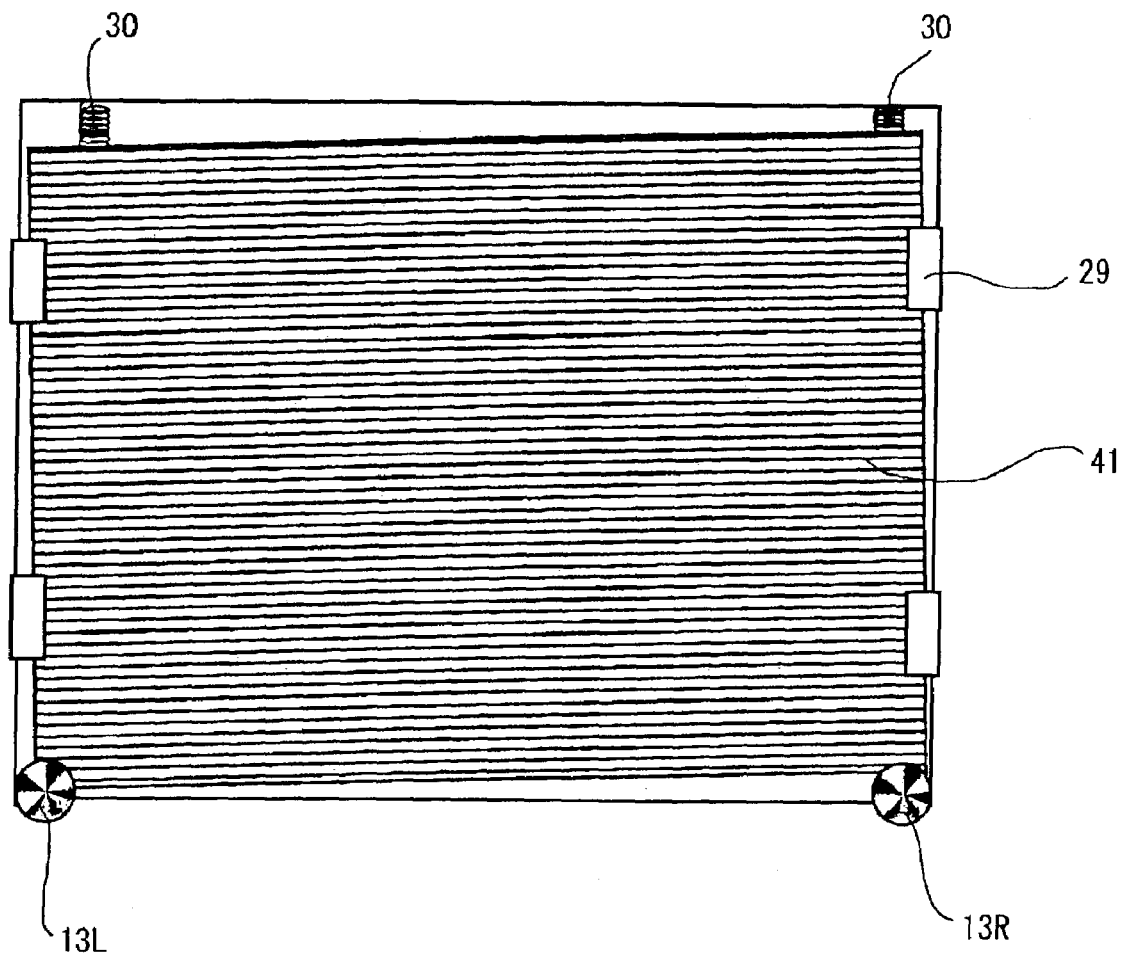
FIG. 8 is a schematic view for illustrating fine adjustment of the position of the divided wavelength plate filter of the three-dimensional image display device of the embodiment of the present invention, and shows a state in which the divided wavelength plate filter is shifted.
Figure 10:
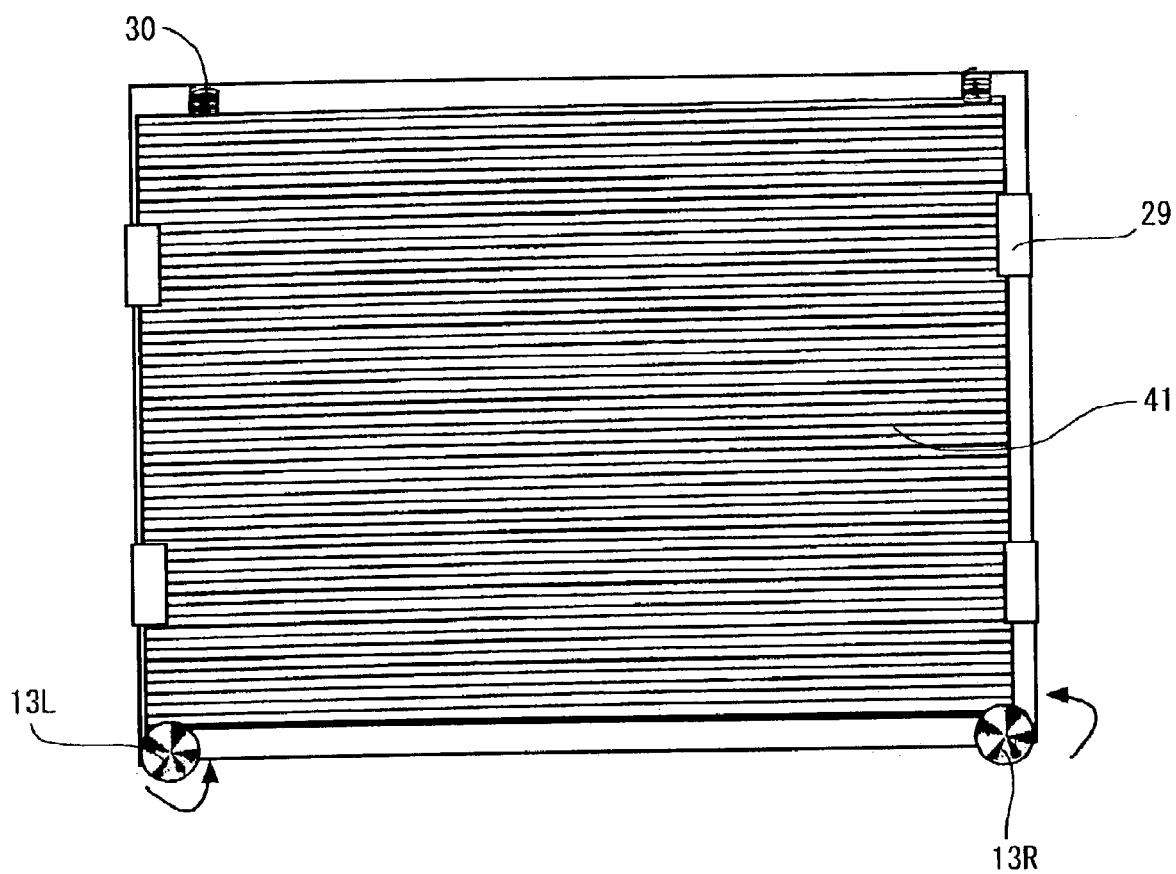
FIG. 10 is a schematic view for illustrating fine adjustment of the position of the divided wavelength plate filter of the three-dimensional image display device of the embodiment of the present invention, and shows a state in which the divided wavelength plate filter is rotationally adjusted.
Figure 11:
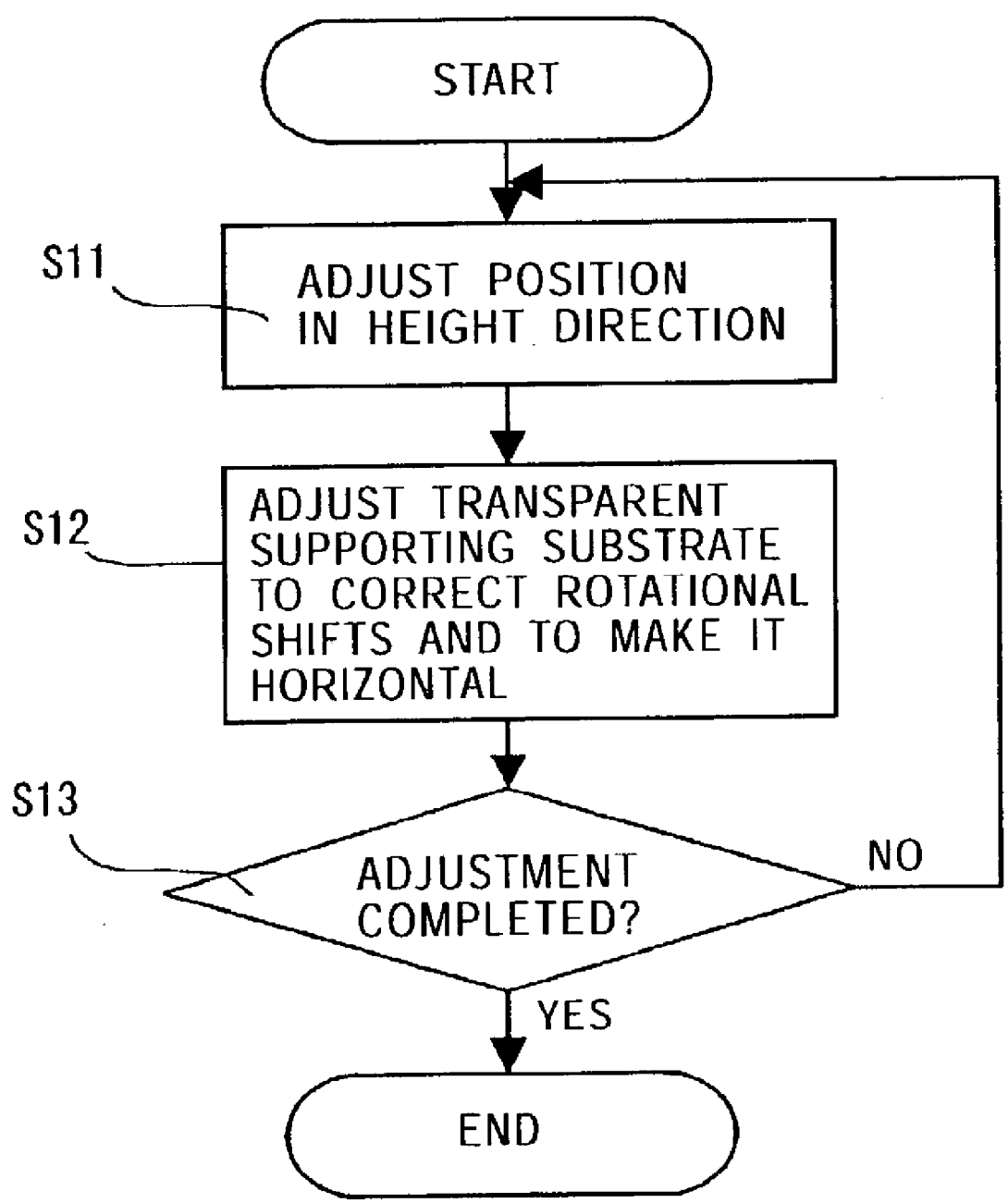
FIG. 11 is a flow chart of the steps for finely adjusting the position of the divided wavelength plate filter of the three-dimensional image display device of the embodiment of the present invention.

A typical adjustment operation will be described with reference to the schematic views of FIGS. 8 to 10 and the flowchart of FIG. 11. This adjustment method is only one example, so that the position of the divided wavelength plate filter of the three-dimensional display device of the embodiment can be adjusted by other methods.

The transparent supporting substrate 41, serving as a frame member of the divided wavelength plate filter, is mounted to the rib at the liquid crystal panel. For example, in the state shown in FIG. 8, the illustrated left side of the transparent supporting substrate 41 is tilted downward, and the illustrated right side of the transparent supporting substrate 41 is tilted upward. Since the pixel pitch is, for example, from 200 to 300 μm, even if the transparent supporting substrate 41 is shifted only slightly, the proper images may not be obtained when an adjustment display pattern is displayed and viewed.

Figure 9:
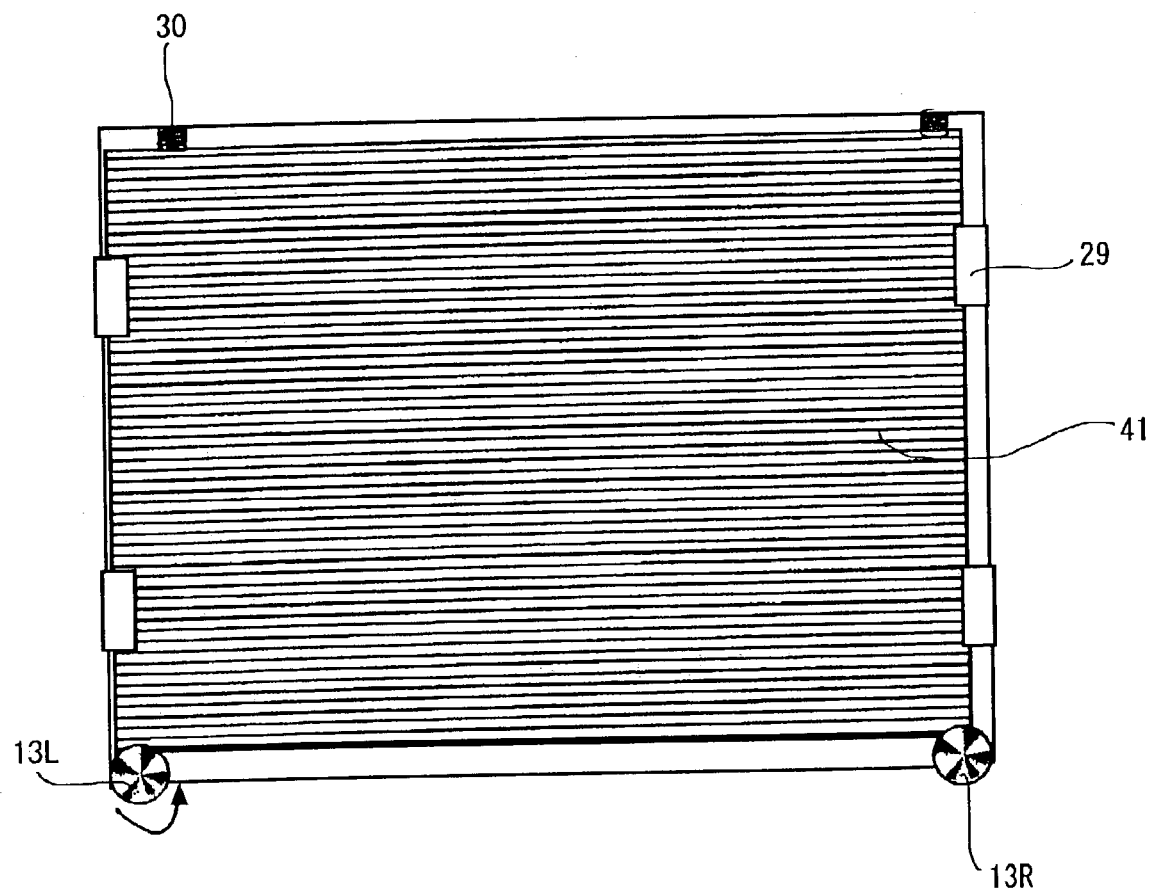
FIG. 9 is a schematic view for illustrating fine adjustment of the position of the divided wavelength plate filter of the three-dimensional image display device of the embodiment of the present invention, and shows a state in which the position of the divided wavelength plate filter in the height direction is adjusted.

From such a shifted state, as shown in FIG. 9, the left adjusting knob 13L at the downwardly tilted left side is operated to adjust the position of the transparent supporting substrate 41 in the height direction so that it is supported substantially horizontally (Step S11). By such an adjustment in the height direction, the divided wavelength plate filter is substantially positioned in correspondence with the pixel sections of the liquid crystal panel. However, there still remains a slight positional shift of the divided wavelength plate filter due to dimensional errors in the panel, expansion due to temperature, etc. To overcome this problem, as shown in FIG. 10, by operating both the left adjusting knob 13L and the right adjusting knob 13R, for example, in opposite directions, a rotational shift of the transparent supporting substrate 41 is adjusted or the transparent supporting substrate 41 is made horizontal in order to correct the positional shift (Step S12).

The positional shift between the divided wavelength plate filter and the image display section is ultimately determined while monitoring an adjustment display pattern (Step S13). The displayed adjustment display pattern is viewed with polarized glasses. If there is no problem in the pattern, the adjustment operation is completed. When a pattern, such as a Moire pattern, is still displayed when the adjustment display pattern has been viewed, the divided wavelength plate filter is not sufficiently adjusted, so that the adjustments carried out in Steps S11 and S12 are repeated for further adjustments.

Figure 12:
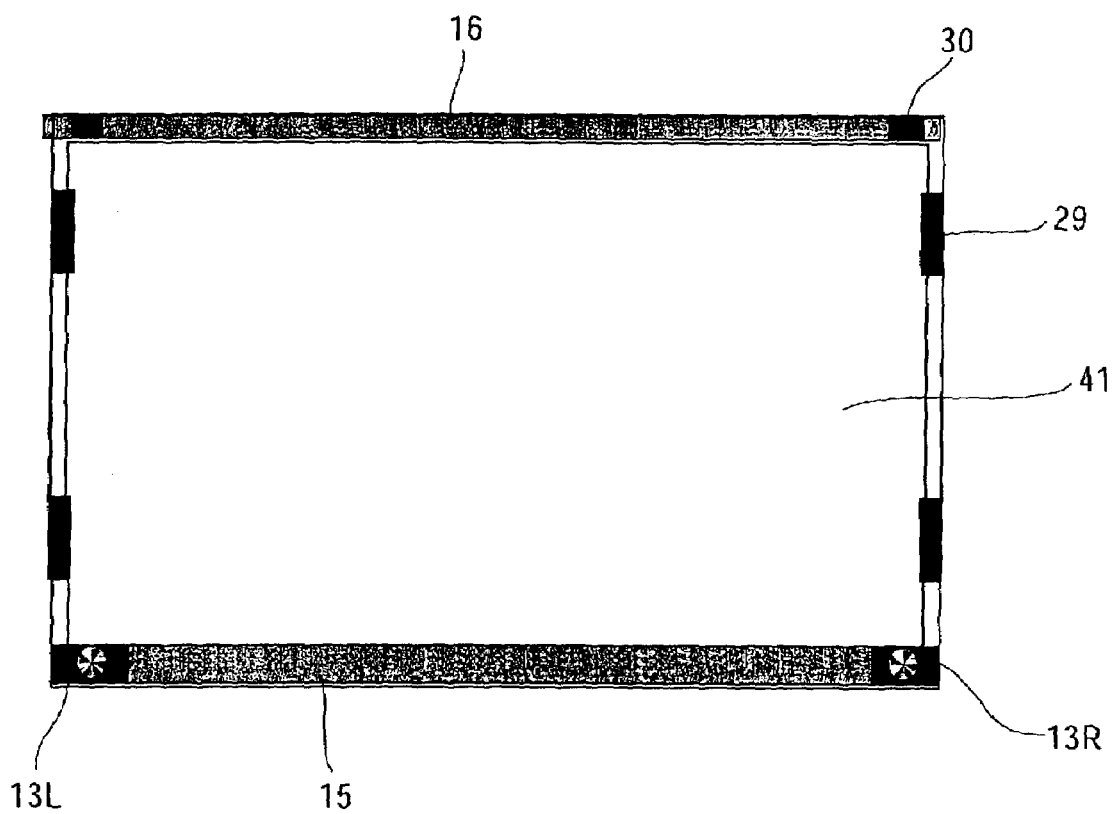
FIG. 12 is a front view of a structure of the divided wavelength plate filter of the three-dimensional image display device of the embodiment of the present invention.
Figure 13:
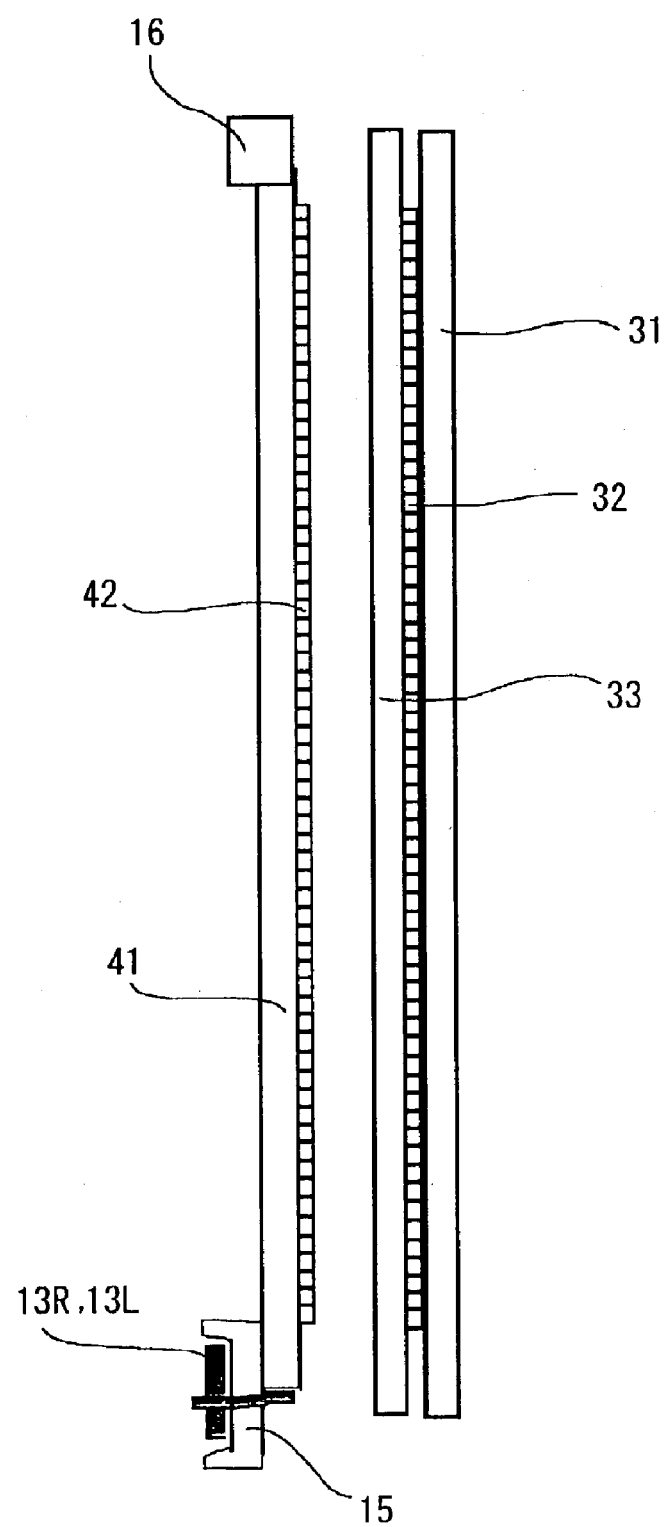
FIG. 13 is a sectional view of the structure of the divided wavelength plate filter of the three-dimensional image display device of the embodiment of the present invention.
Figure 14:
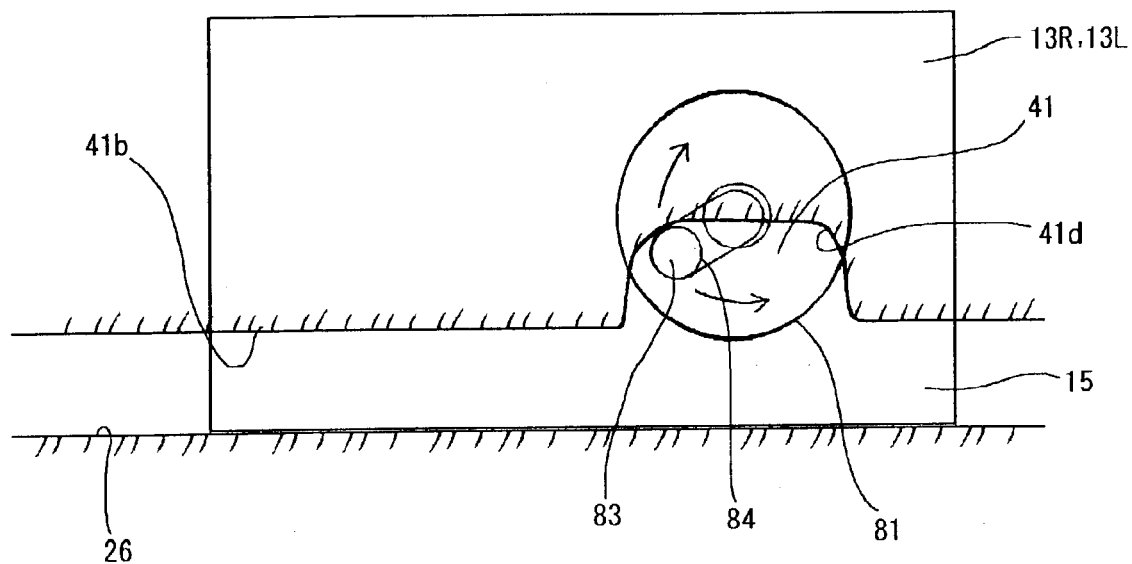
FIG. 14 is a back view of knobs for adjusting the divided wavelength plate filter of the three-dimensional image display device of the embodiment of the present invention and the portions in the vicinity of the knobs.
Figure 15:
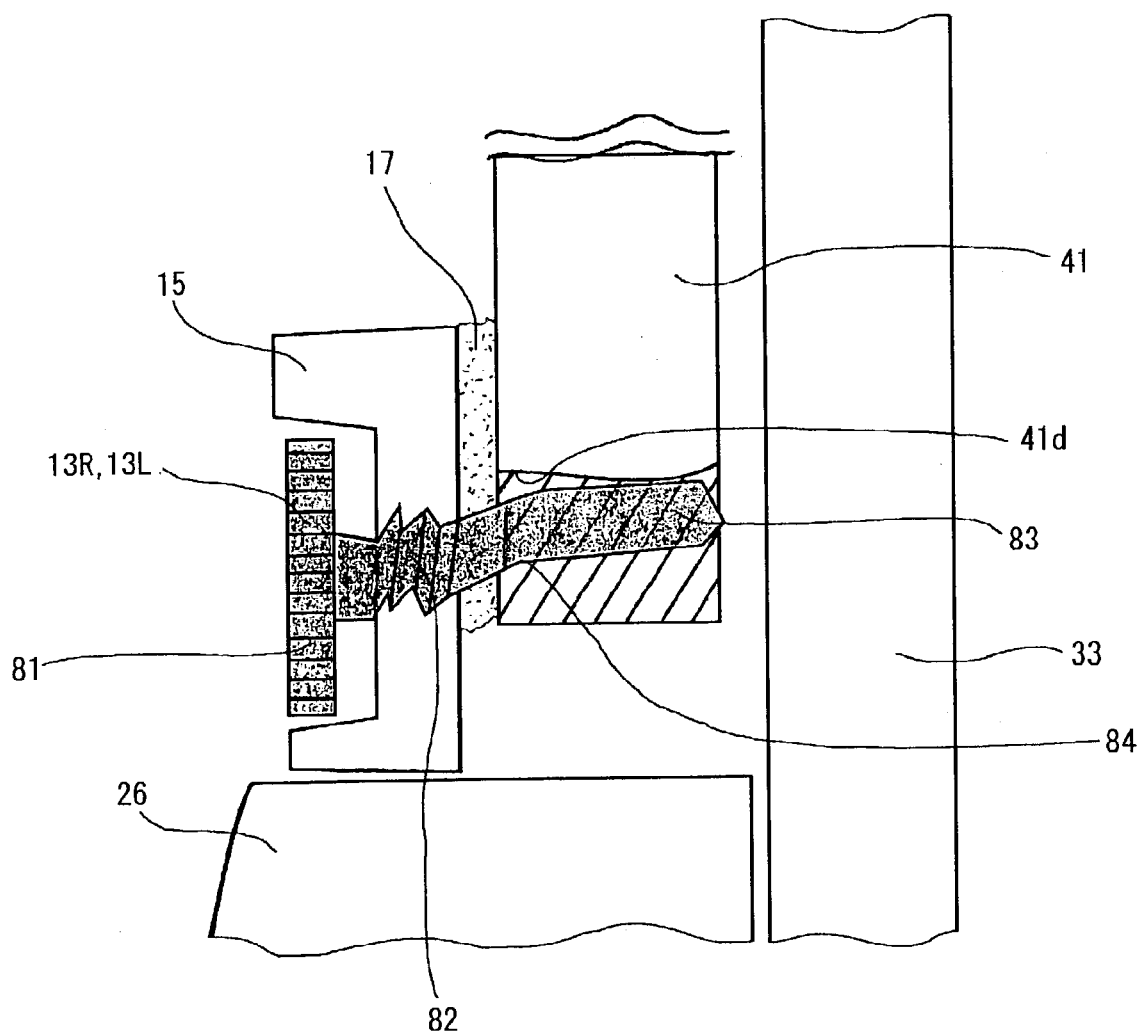
FIG. 15 is a sectional view of the knobs for adjusting the divided wavelength plate filter of the three-dimensional image display device of the embodiment of the present invention and the portions in the vicinity of the knobs.

FIGS. 12 to 15 show the left adjusting knob 13L and the right adjusting knob 13R, serving as position adjusting means, and the mechanism around them. As shown in FIG. 12, the horizontal supporting member 15 is mounted to the bottom end of the transparent supporting substrate 41, serving as a frame, and is formed of a material having relatively high rigidity such as metal or resin. The horizontal supporting member 15 is formed over the entire area of the bottom end of the transparent supporting substrate 41, and is, for example, substantially U shaped in cross section as shown in FIG. 13. As shown in FIG. 15, the horizontal supporting member 15 is mounted to the bottom end of the transparent supporting substrate 41 through a semi-fixed resin agent 17. By interposing such semi-fixed resin 17, it is possible to prevent the horizontal supporting member 15 from being completely separated from the transparent supporting substrate 41, and, when the position of the transparent supporting substrate 41 is finely adjusted by operating the left adjusting knob 13L and the right adjusting knob 13R, the transparent supporting substrate 41 and the horizontal supporting member 15 are connected in accordance thereto.

A top end member 16 is mounted to the top end of the transparent supporting substrate 41, and a pair of left and right springs 30, which are resilient members, are disposed in the top end member 16. The top ends of the springs 30 are disposed so as to contact the inner sides of the top end member 16, and the bottom ends thereof contact the topside surface of the transparent supporting substrate 41. By forming such springs 30, the position of the divided wavelength plate filter can be finely adjusted by the left adjusting knob 13L and the right adjusting knob 13R, so that the adjustment of the position of the divided wavelength plate filter in the height direction, which is perpendicular to the direction of extension of the divided wavelength plate filter, can be easily carried out. The top end member 16 also functions to fix the position after the adjustment and to prevent positional shift due to play. As shown in the relevant figures, guides 29 may be provided as part of the adjusting means. The guides 29 function as restricting means for restricting the position of the divided wavelength plate filter in the direction in which it is divided with each line. Therefore, by mounting the transparent supporting substrate 41 by fitting it to the guides 29, it is possible to control the divided wavelength plate filter so that it is not shifted in the direction in which it is divided when the divided wavelength plate filter of the three-dimensional image display device is moved and adjusted. Consequently, the adjustment can be easily carried out.

The left adjusting knob 13L and the right adjusting knob 13R, serving as position adjusting means, have structures in which what are called eccentric screws are used. FIGS. 14 and 15 are a rear back and a sectional view, respectively, of the left adjusting knob 13L and the right adjusting knob 13R and the portions therearound.

As shown in FIGS. 14 and 15, the adjusting knobs 13L and 13R are provided at the bottom end of the transparent supporting substrate 41 as parts of a position adjusting mechanism. Threaded rods 82, which are situated away from the centers of rotation of their respective adjusting knobs 13L and 13R, are formed so as to be screwed into the threaded holes that pass through the horizontal supporting member 15. An end portion 83 of each threaded rod 82 is in contact with a side surface defining a respective cutaway portion 41d at the bottom end of the transparent supporting substrate 41 and having a substrate thickness. By rotating the adjusting knobs 13L and 13R, the end portions 83 push the cutaway portions 41d at the bottom end of the transparent supporting substrate 41 upward or move the transparent supporting substrate 41 downward while contacting it by, for example, gravity. In FIG. 14, by rotating the adjusting knobs 13L and 13R clockwise, the cutaway portions 41d at the bottom end of the transparent supporting substrate 41 can be moved upward, whereas, by rotating the adjusting knobs 13L and 13R counterclockwise, the cutaway portions 41d at the bottom end of the transparent supporting substrate 41 can be moved downward. As shown in FIG. 15, by the bottom end cutaway portions 41d, the end surfaces of the transparent supporting substrate 41 have compressed forms, so that the adjusting knobs 13L and 13R can be smoothly rotated. The adjusting knobs 13L and 13R can be easily rotated by operating respective disc-shaped sections 81 that have bumpy outer peripheral portions for preventing sliding. Although the threaded rods 82 are bent at respective bending sections 84, they may be crank-like threaded rods or the like. The centers of rotation of the disc-shaped sections 81 are not limited to the threaded holes passing through the horizontal supporting member 15, so that other members may be used as the centers of rotation.

Figure 16:
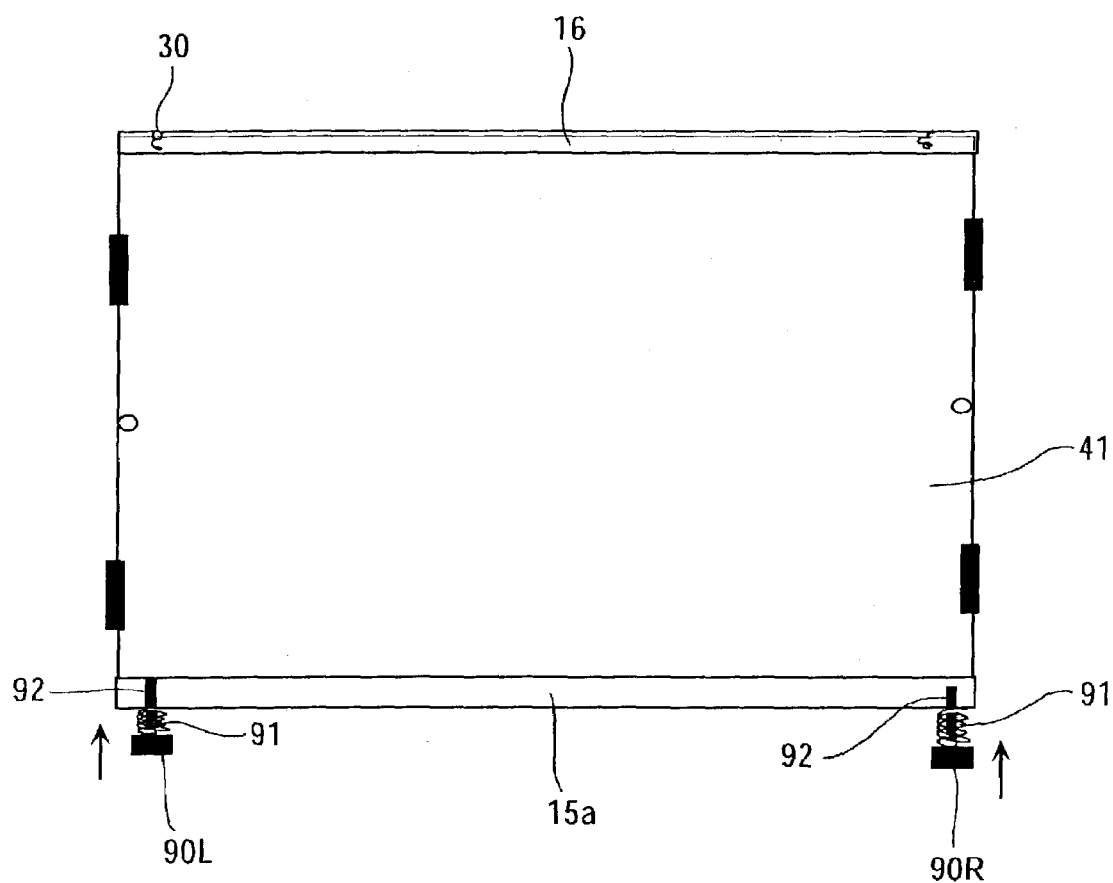
FIG. 16 is a front view of another structure of the divided wavelength plate filter of the three-dimensional image display device of the embodiment of the present invention.
Figure 17:
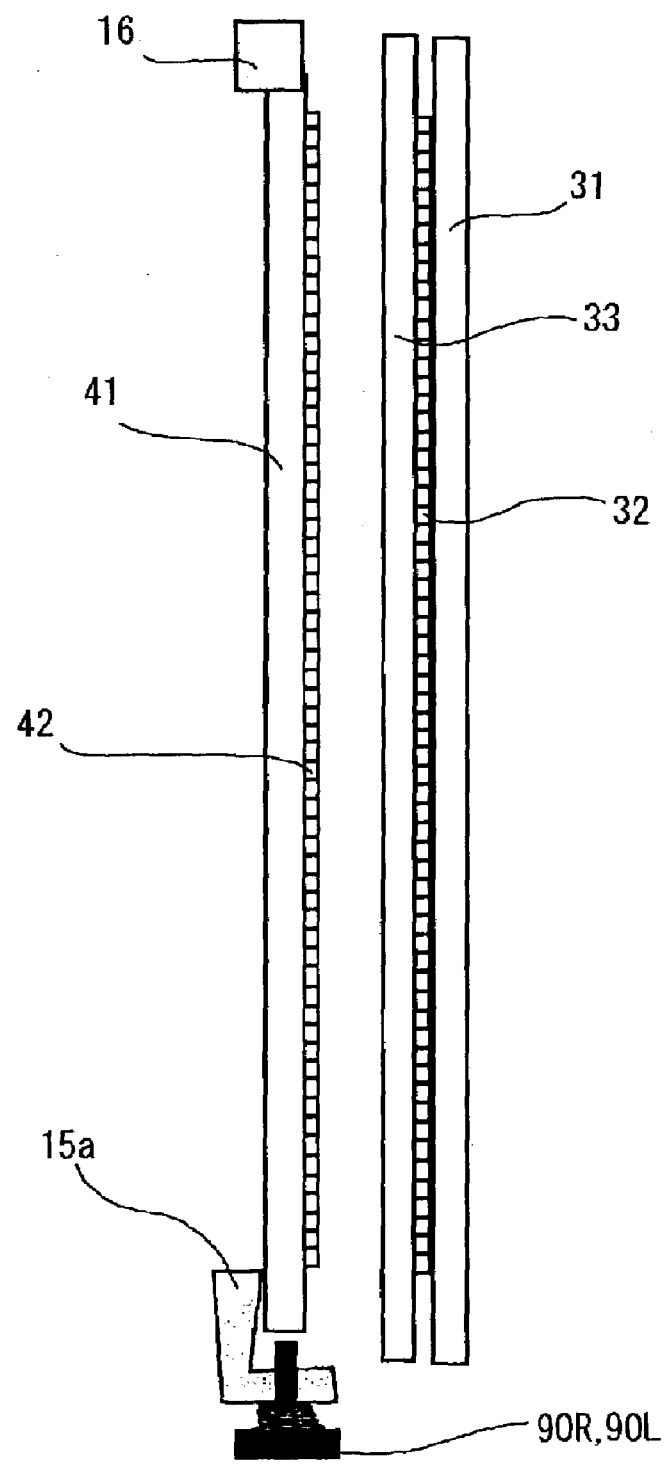
FIG. 17 is a sectional view of the another structure of the divided wavelength plate filter of the three-dimensional image display device of the embodiment of the present invention.

A modification of the position adjusting means will be described with reference to FIGS. 16 and 17. In the modification, a horizontal holder 15a is formed over the entire bottom end portion of the transparent supporting substrate 41, and adjusting knobs 90L and 90R are mounted so as to protrude downward from the bottom surface of the horizontal holder 15a. Through springs 91, the adjusting knobs 90L and 90R are inserted in threaded holes passing substantially vertically through the bottom portion of the horizontal holder 15a. Top ends 92 of the adjusting knobs 90L and 90R come into contact with the transparent supporting substrate 41 and finely adjust it in the vertical direction.

By moving the ends 92 upward by rotating the adjusting knobs 90L and 90R, an upward force is exerted upon the transparent supporting substrate 41 connected to the adjusting knobs 90L and 90R with a semi-fixed resin, thereby causing the transparent supporting substrate 41 to be moved upward and adjusted. Similarly, when the adjusting knobs 90L and 90R are rotated in the opposite direction, the ends 92 move downward, thereby causing the transparent supporting substrate 41 to be moved downward and adjusted. Even with the adjusting knobs 90L and 90R having such a structure, the position of the transparent supporting substrate 41 can be reliably adjusted.

Figure 18:
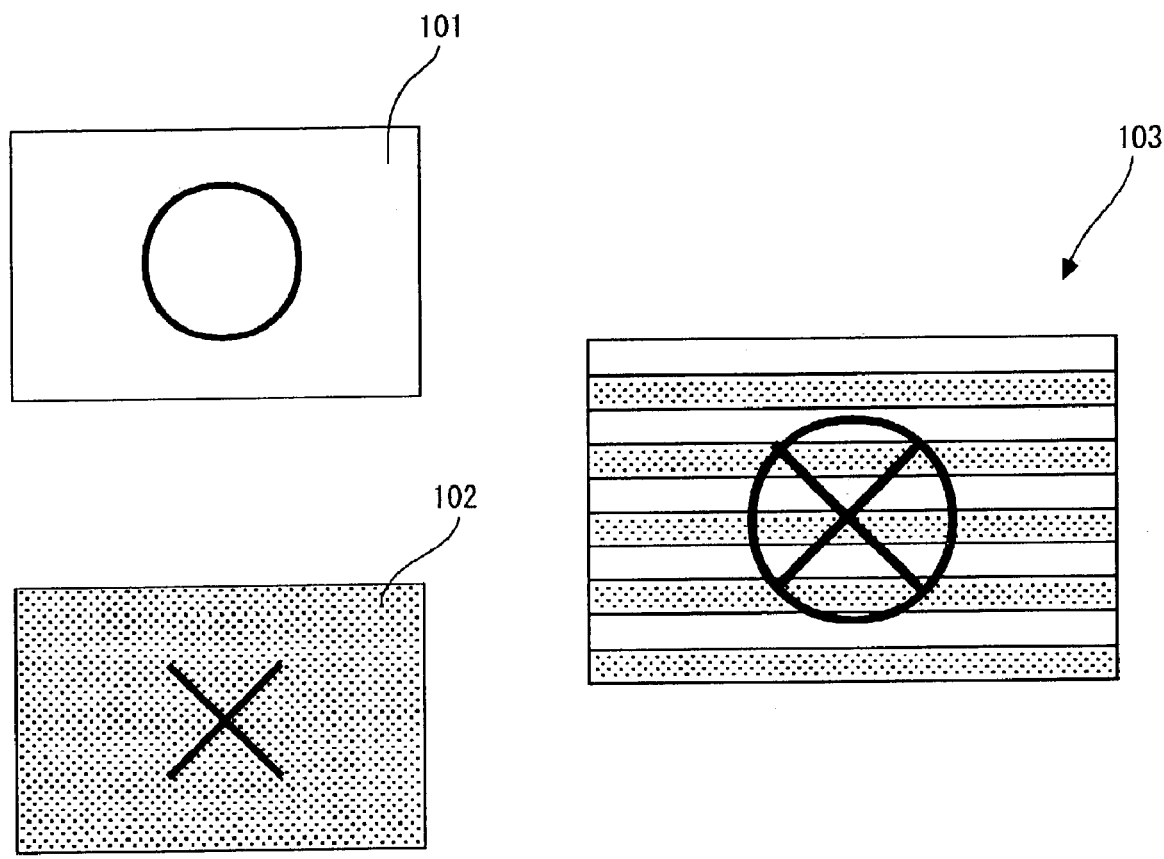
FIG. 18 illustrates an example of an adjustment pattern which is displayed when an adjustment operation is performed in the three-dimensional image display device of the embodiment of the present invention.
Figure 19:
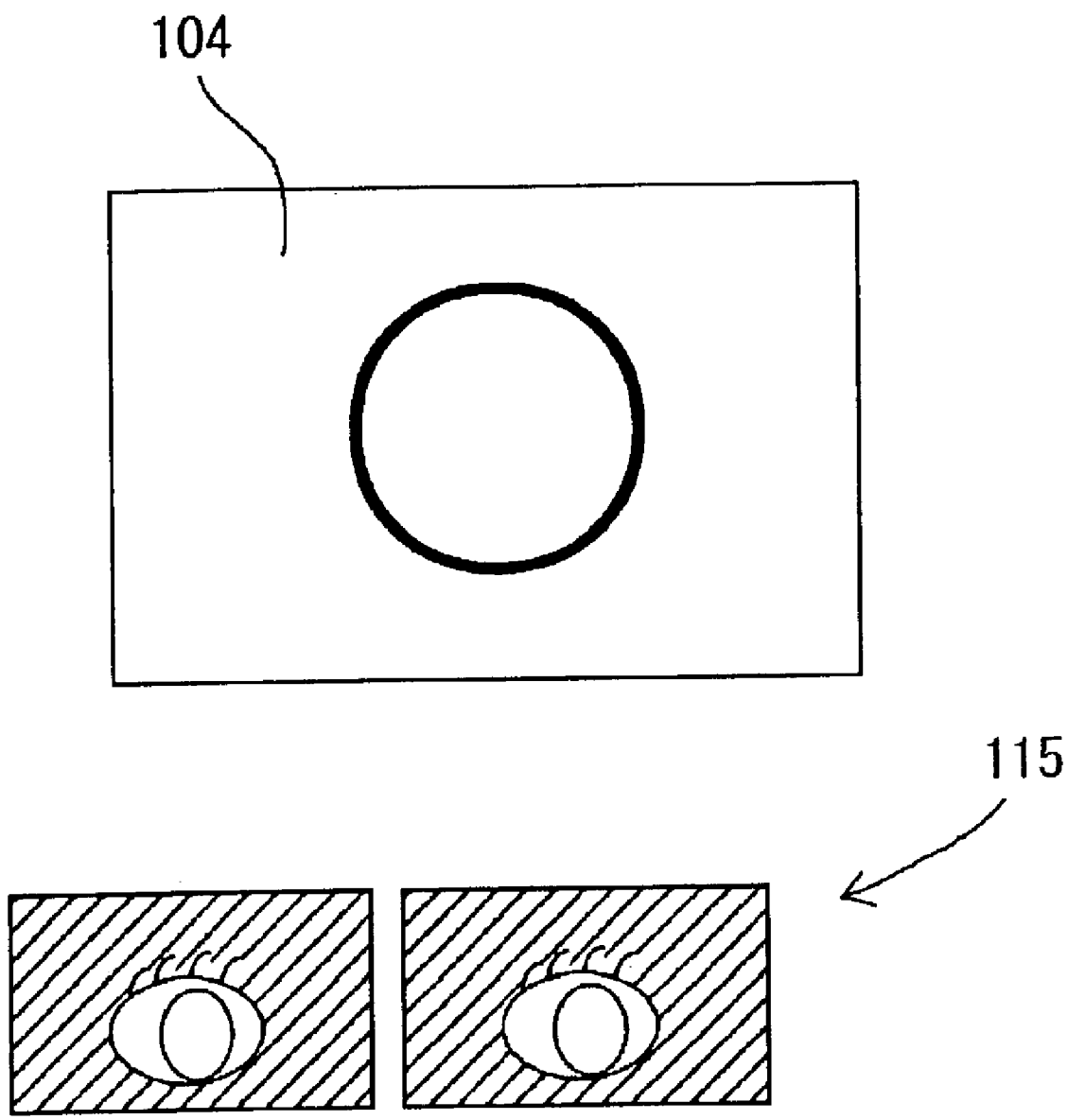
FIG. 19 illustrates one type of the adjustment pattern which is displayed when an adjustment operation is performed in the three-dimensional image display device of the embodiment of the present invention, and shows the state of a screen viewed by a viewer when the adjustment operation in the three-dimensional image display device has been properly carried out.
Figure 20:
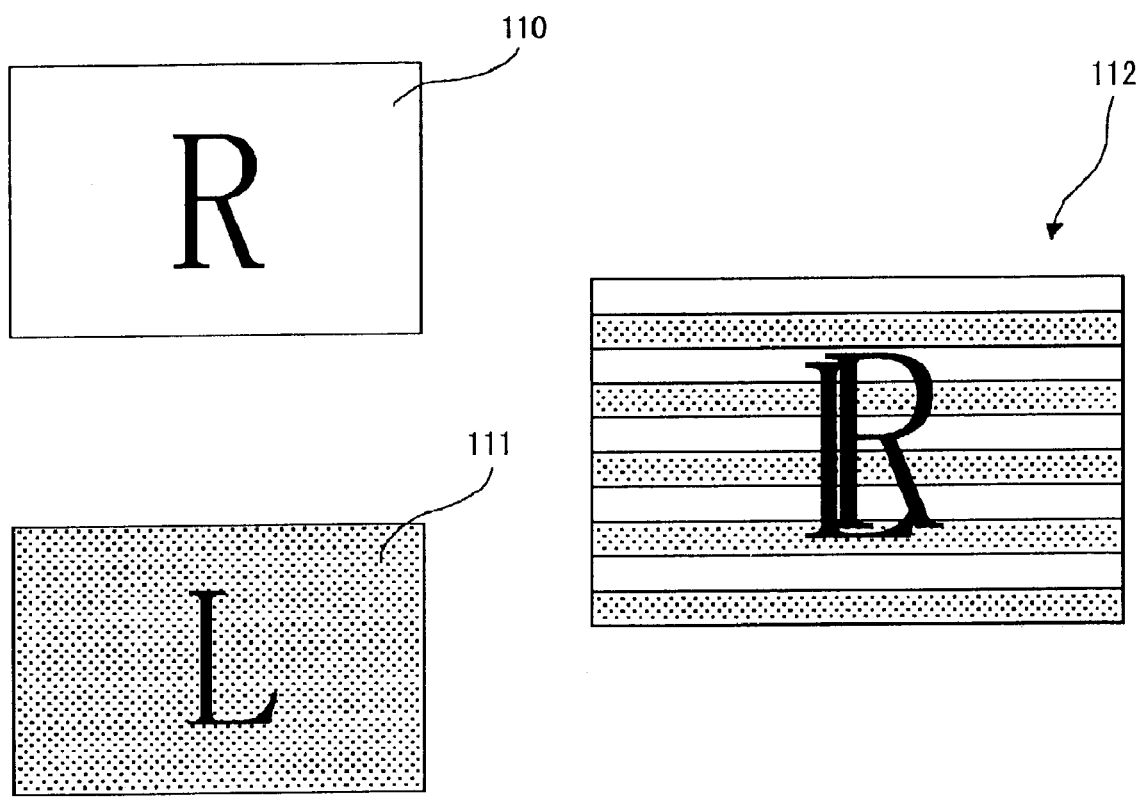
FIG. 20 illustrates another example of an adjustment pattern which is displayed when an adjustment operation is performed in the three-dimensional image display device of the embodiment of the present invention.

FIGS. 18 to 21 illustrate adjustment patterns which are displayed on the display device during adjustment. FIG. 20 illustrates an example of an adjustment pattern which is displayed on the display device during adjustment. The adjustment pattern which is displayed on the display device is an adjustment pattern 112 which comprises a black letter R and a black letter L that are superimposed upon each other, and which has a red background 110 of the letter R and the green background 111 of the letter L that are alternately displayed at every other line. The red background 110 of the letter R forms an image for the right eye, and the green background 111 of the letter L forms an image for the left eye.

Figure 21:
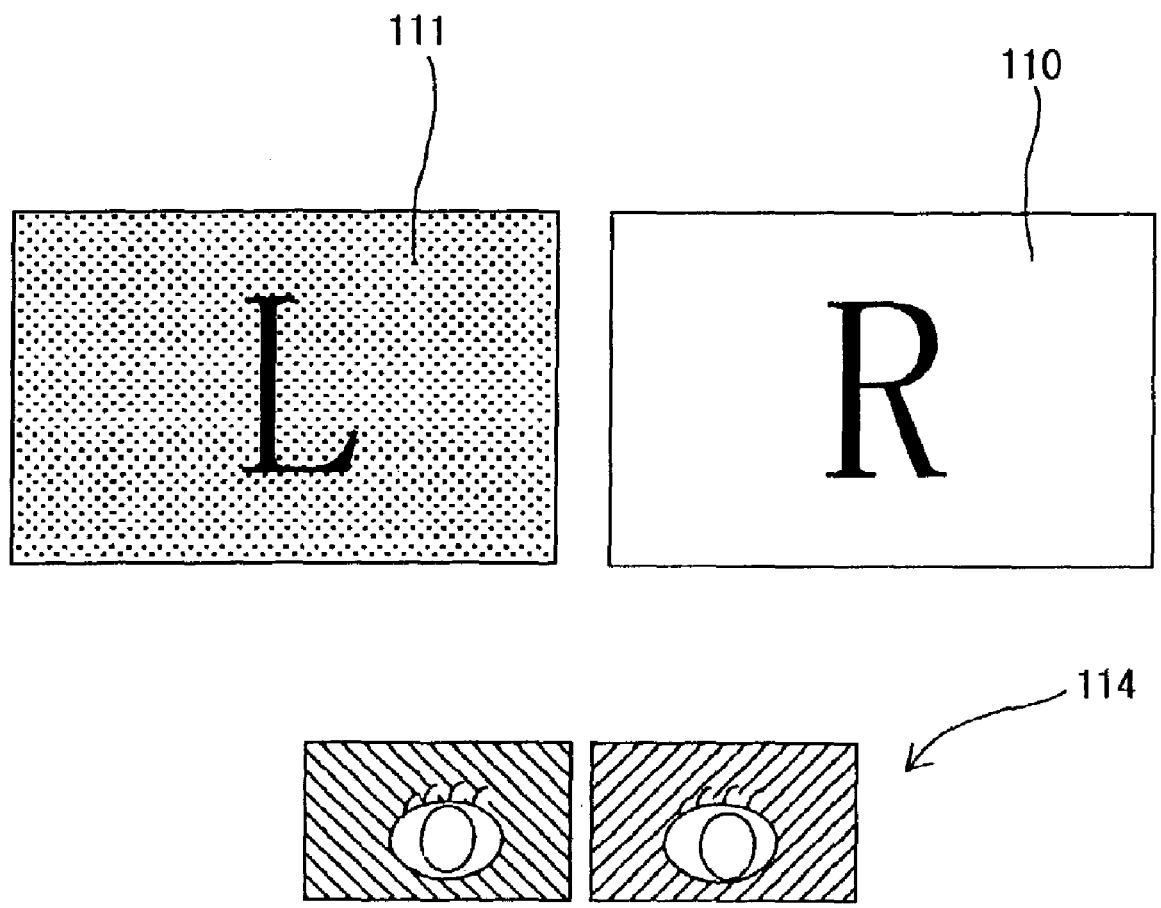
FIG. 21 illustrates one type of the adjustment pattern which is displayed when an adjustment operation is performed in the three-dimensional image display device of the embodiment of the present invention, and shows the state of the screen viewed by a viewer when the adjustment operation in the three-dimensional image display device has been properly carried out.

If the adjustment pattern 112 is viewed without polarized glasses, the adjustment pattern 112 can be viewed in the way it is displayed. In the case where the divided wavelength plate filter is at the proper position, when the viewer wears polarized glasses 114, as shown in FIG. 21, the left eye sees the green background 111 of the letter L and the right eye sees the red background 110 of the letter R.

However, when the divided wavelength plate filter is shifted, a portion of the image for the right eye passes through a portion of a divided wavelength plate (see, for example, FIG. 5), causing the polarization direction to change. Therefore, this portion of the image for the right eye passes through the left lens of the polarized glasses, so that this portion of the image is viewed by the left eye. In addition, a portion of the image for the left eye is seen by the right eye because it passes through the right lens of the polarized glasses without passing through a separated wavelength plate and thus without the polarized light being rotated. In this way, when the divided wavelength plate filter is tilted, two background colors 111 and 110 are seen by both the left and right eyes.

This means that, when the position of the divided wavelength plate filter is shifted in the vertical direction, for example, the image for the right eye that actually does not pass through the separated wavelength plates passes through the separated wavelength plates, and, at the same time, the image for the left eye that actually passes through the separated wavelength plates does not pass through the separated wavelength plates. As a result of this, the image for the right eye passes through the opposite left lens and is seen by the left eye, whereas the image for the left eye passes through the opposite right lens and is seen by the right eye.

Therefore, when, as described above, there is a mixture of colors or the left and right images are oppositely viewed by the right and left eyes, respectively, the viewer can immediately tell that the divided wavelength plate filter is shifted. By adjusting such a positional shift by the adjusting knobs 13L and 13R or 90L and 90R, the divided wavelength plate filter can be easily adjusted to its proper position.

Although FIGS. 20 and 21 show the adjustment pattern which comprises a black letter R and a black letter L that are superimposed upon each other, and which has a red background 110 of the letter R and a green background 111 of the letter L that are alternately displayed at every other line, the pattern is not limited to that having the colors and the letters mentioned above, so that any type of pattern may be used as long as the pattern is for outputting pieces of visual information for the left and right eyes that differ from each other. The position adjustment pattern may have different colors, figures, characters, symbols, diagrams, designs, or a combination of these. For example, the pattern may have a hatch design for one of the images and with a grid design or a painted design for the other image; or the pattern may have its intensity greatly changed. The other image may be such that it is not detected. In this case, the pattern may comprise only one image, such as only the right-eye image or the left-eye image.

FIGS. 18 and 19 show another example of an adjustment pattern which is displayed on the display device during adjustment. As shown in FIG. 18, the pattern which is displayed on the display device is an adjustment pattern 103 which comprises a black circle and a black cross that are superimposed upon each other, and which has a red background 101 of the circle and a green background 102 of the cross that are alternately displayed at every other line. The red background 101 of the black circle forms an image for the right eye, and the green background 102 of the left eye forms an image for the left eye.

If the adjustment pattern 103 is viewed without the polarized glasses, the adjustment pattern 103 can be viewed in the way it is displayed. In the case where the divided wavelength plate filter is at the proper position, when the viewer wears adjustment polarized glasses 115 having right-eye polarizing filters for both eyes, as shown in FIG. 19, the red background 104 of the black circle is seen by both eyes. The red background 104 of the black circle indicates that the divided wavelength plate filter is at its proper position. When the red background 104 of the black circle does not appear, the viewer can immediately tell that the divided wavelength plate filter is shifted. By correcting such a positional shift by the adjusting knobs 13L and 13R or 90L and 90R, the divided wavelength plate filter can be easily adjusted to its proper position. In particular, in this example, since the adjustment pattern 103 can be viewed with both eyes, the position of the divided wavelength plate filter can be easily adjusted even by a user who has trouble closing one eye.

Figure 22:
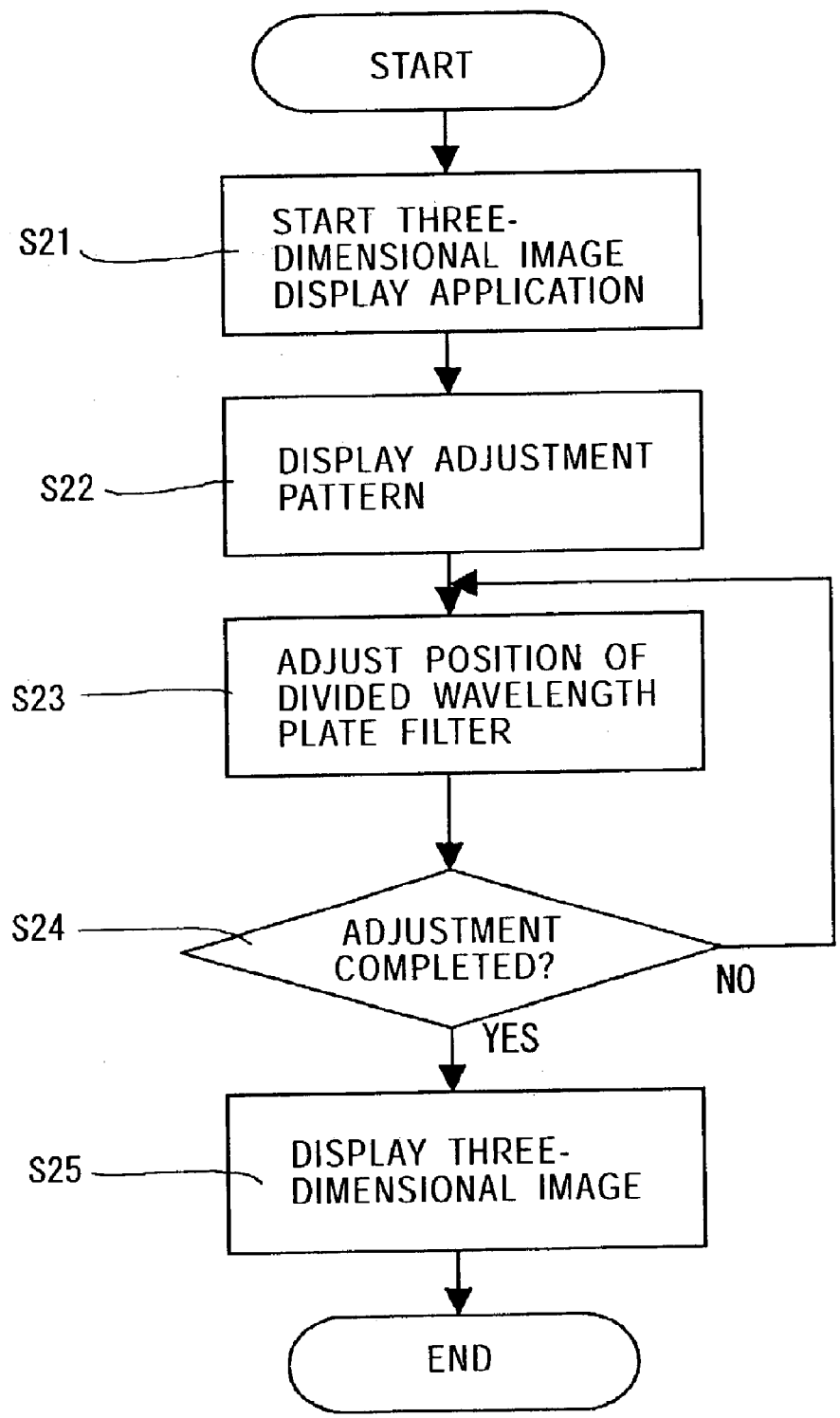
FIG. 22 is a flow chart for illustrating the steps for positional adjustment when the three-dimensional image display device of the embodiment of the present invention starts a displaying operation.

FIG. 22 is a flow chart illustrating the steps for positional adjustment. When displaying z three-dimensional image, the notebook computer 11 shown in FIG. 1 opens an application for displaying a three-dimensional image in Step S21. By this operation, the adjustment pattern 112 shown in FIG. 20 or the adjustment pattern shown in FIG. 18 is automatically displayed on the screen in Step S22. The user adjusts the position while viewing the adjustment pattern 112 or 103 with polarized glasses in Step S23. This Step S23 is repeated until the adjustment is completed in Step S24. After the adjustment is completed, a three-dimensional image is subsequently displayed either manually or automatically in Step S25, so that the adjustment process is completed.

By carrying out the steps of such a flow chart when the position is adjusted, the adjustment the three-dimensional image display is unfailingly carried out when the application for displaying a three-dimensional image is started, so that even a user displaying a three-dimensional image for the first time can start from the adjustment process.

Figure 23:
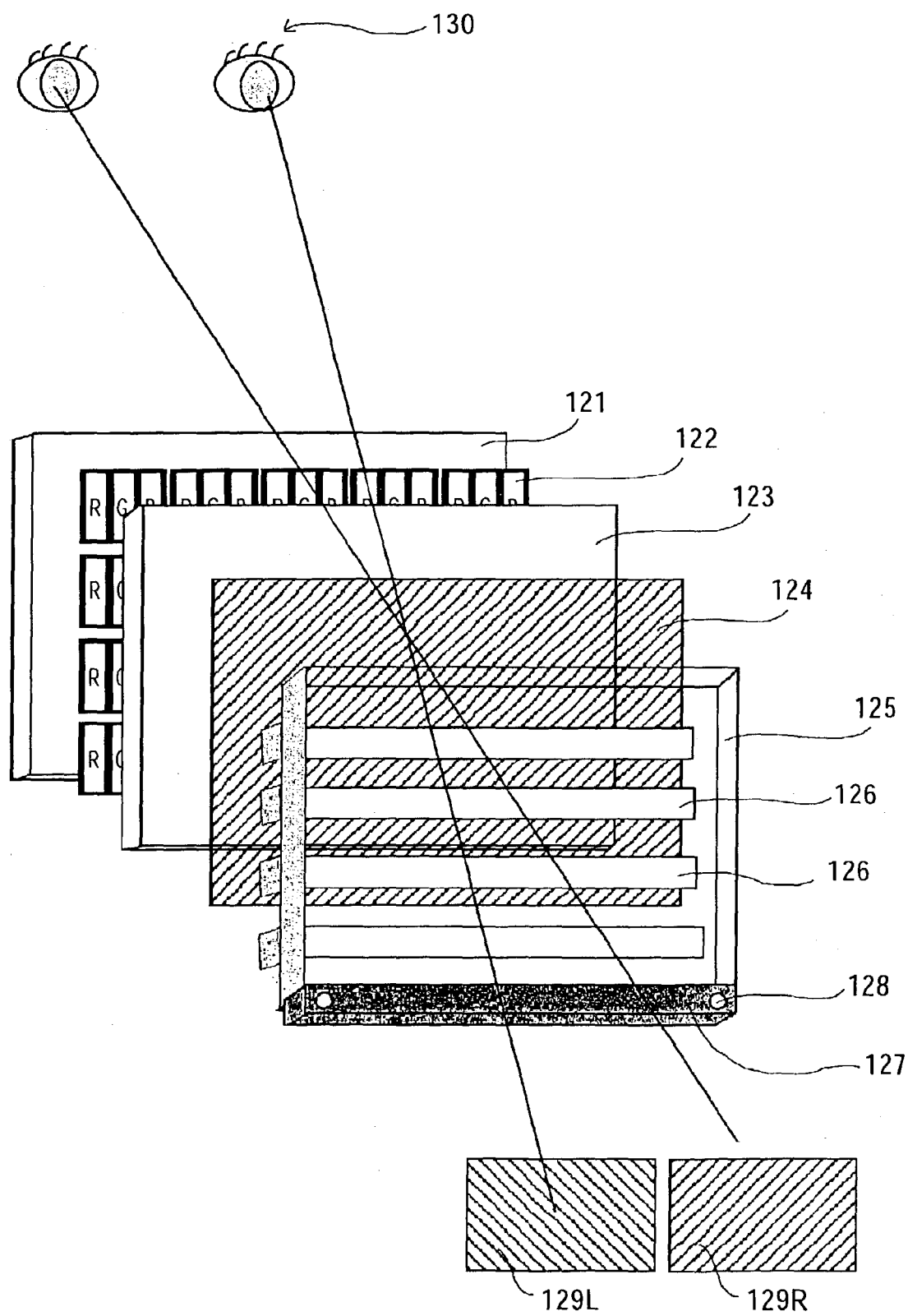
FIG. 23 is an exploded schematic view of the structure of a divided wavelength plate filter and pixel sections of a three-dimensional image display device of another embodiment of the present invention.
Figure 24:
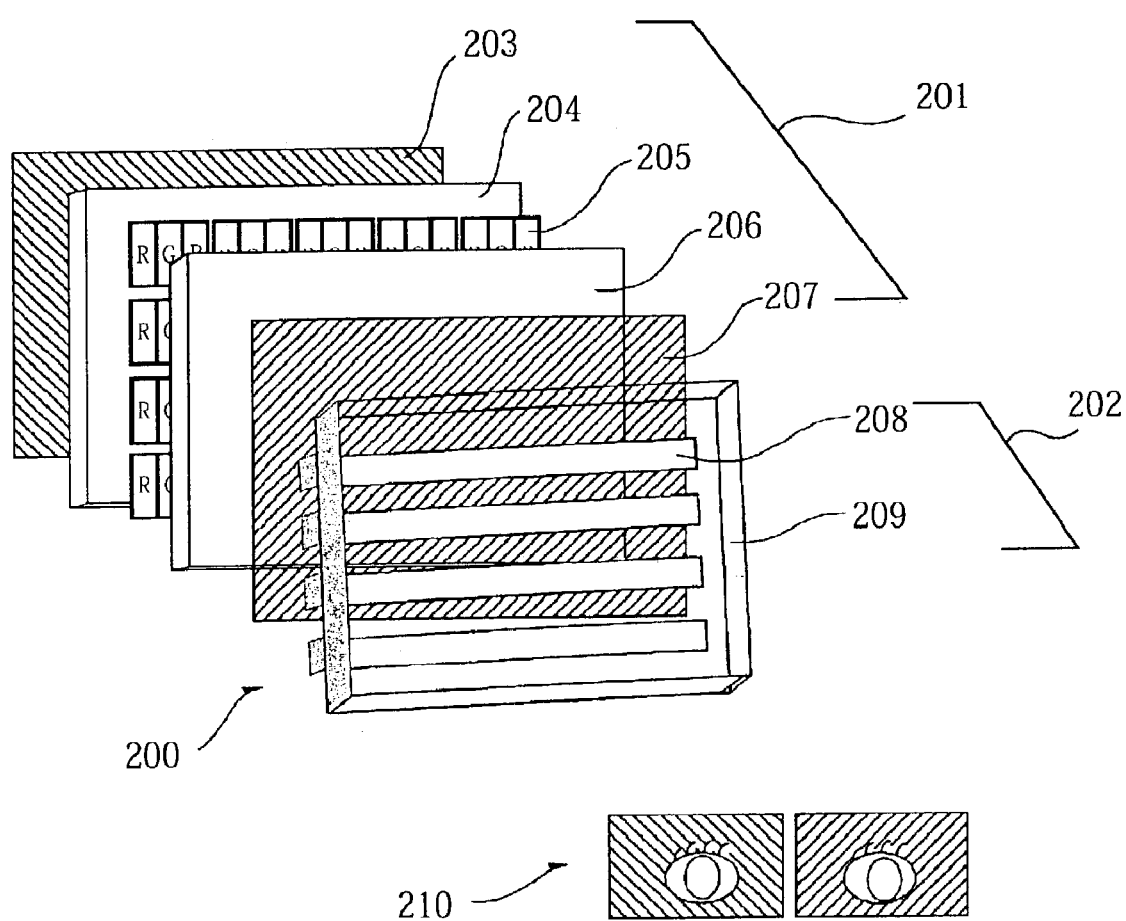
FIG. 24 is an exploded schematic view of a divided wavelength plate filter and pixel sections of a related three-dimensional image display device.
Figure 25:
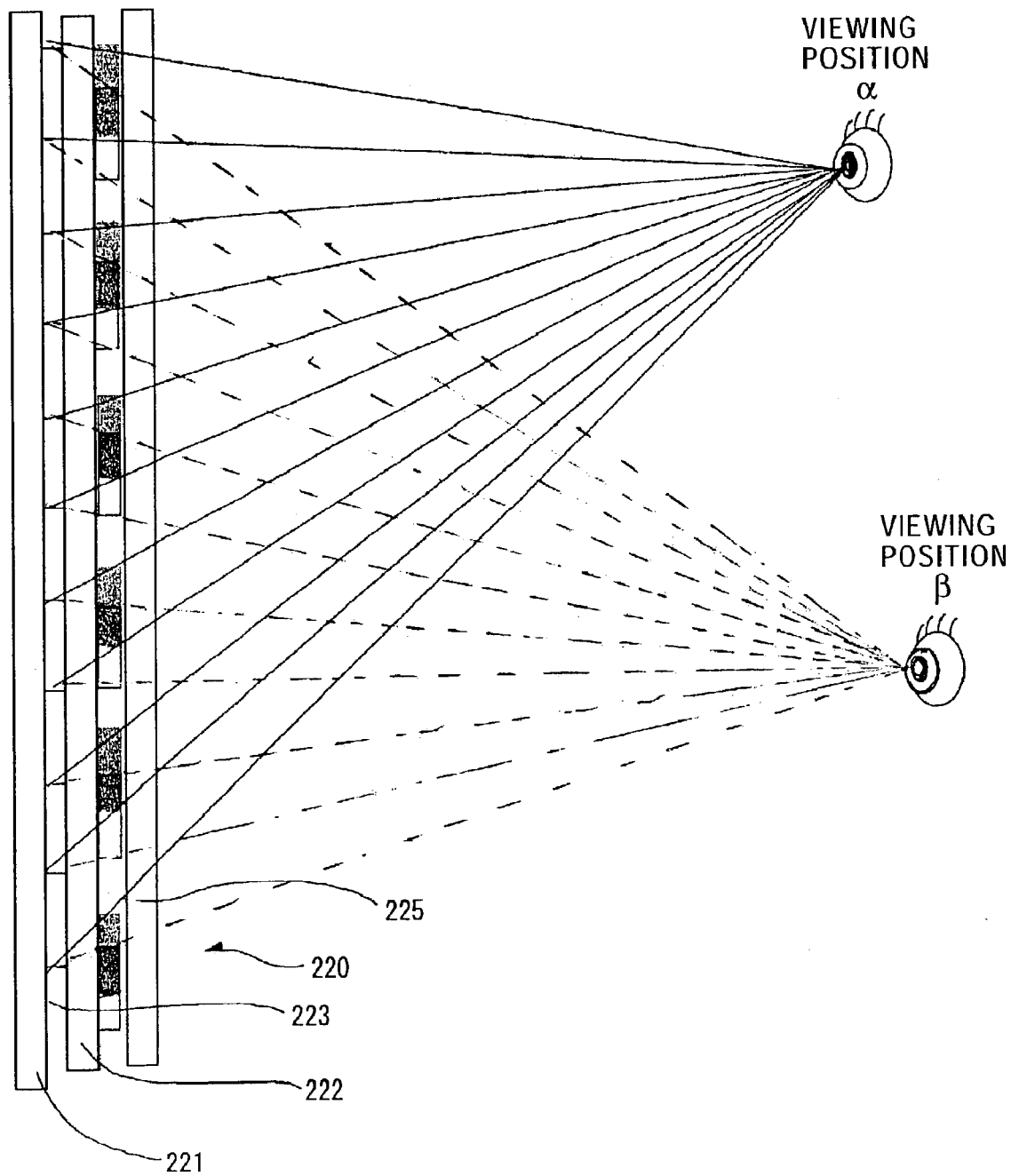
FIG. 25 is a sectional view of the structure of the divided wavelength plate filter of the related three-dimensional image display device.

FIG. 23 shows another embodiment of a three-dimensional image display device provided with a backlight mechanism. In this embodiment, polarized glasses are not required. The display of a three-dimensional image is made possible by a combination of a light source, serving as a backlight mechanism, having polarization directions that are orthogonal to each other through polarizing filters 129L and 129R, the structure at the liquid crystal panel side, and the structure of a divided wavelength plate filter. In the structure of the liquid crystal panel side, liquid crystal pixel sections 122 are disposed between a pair of transparent supporting substrates 121 and 123 and comprises pixels of three colors arranged in a matrix.

A polarizing plate 124 is disposed at the light source side of the transparent supporting substrate 123 The divided wavelength plate filter has separated strip-shaped wavelength plates 126 at one side of a transparent supporting substrate 125 functioning as a frame and formed of glass or the like, that is, at the liquid crystal panel side of the transparent supporting substrate 123 in the embodiment. The separated wavelength plates 126 extend so that their longitudinal directions are horizontal, with the widths of the strips being about the same as the pixel pitch of the liquid crystal pixel sections 122. The number of separated wavelength plates 126 is half the number of pixels of the liquid crystal pixel sections 122 in the vertical direction.

A horizontal holder 127, which is similar to the horizontal holder 15, is mounted to the bottom portion of the transparent supporting substrate 125 serving as a frame, and, as described later, threaded holes 128 having position adjusting means, such as a left adjusting knob and a right adjusting knob, mounted thereto are formed in portions of both ends of the horizontal holder 127.

By using the position adjusting means, such as the left adjusting knob and the right adjusting knob, mounted in this adjusting mechanism, the position of the transparent supporting substrate 125 can be reliably adjusted, so that an optimal three-dimensional image can be viewed. As shown in FIG. 23, in this system, since the wavelength plate filter is disposed at the back side of the display surface, it is difficult to physically directly come into contact with the adjusting mechanism when viewing the display surface. Therefore, after positional adjustment, it can be adjusted again if necessary. In addition, it is possible to make the adjusting mechanism movable by electric operation and provide an operating section thereof at the display surface disposed at the viewer side.

Although, in the above-described embodiments, the display devices are described as displaying left and right images three-dimensionally on one display screen, a display device having the same divided wavelength plate filter may be used to display images for two or more screens on one display screen. By the above-described position adjusting means, the position can be easily adjusted.

A position adjustment program software may be started in accordance with an input operation of an execution command by the user instead of automatically starting the position adjustment program software. In addition, the position adjustment program software may be started at every predetermined time interval during start-up of the three-dimensional image display program. Further, it is possible to display a position adjustment pattern only when the user responds in the affirmative to a question displayed on the screen asking whether or not an adjustment is to be carried out.

The display device may be made to display an image instructing the way to make adjustments in addition to a position adjustment pattern. For example, arrows indicating the positions of the right adjusting knob and the left adjusting knob or the statement "Please make an adjustment by moving the knobs at the bottom left and right corners of the display device" may be displayed. In addition, it is possible to display the directions of rotation of the left and right adjusting knobs and anything which indicates whether the wavelength plate filter is moved upward or downward thereby. For example, clockwise and counterclockwise arrows may be displayed near the left and right adjusting knobs, and the words "up" and "down" may be displayed for these arrows. Further, more specifically, a statement or image instructing the method of making adjustments may be displayed in accordance with the state of an image. For example, in the case where the position adjustment pattern shown in FIG. 18 and the polarized glasses shown in FIG. 19 are used, when the right side of the pattern appears considerably green, an image or statement of an instruction such as "Please turn the right adjusting knob to the left until the pattern no longer appears green" may be provided.

The image for instructing the method of adjustment may be displayed, for example, only when the position adjustment pattern is displayed for the first time, so that the image may not be displayed at all depending on how accustomed the user is to making adjustments due to, for example, the number of times it has been displayed.

As described above, according to the present invention, by using a position adjustment pattern for outputting pieces of visual information that differ with segments, the user can easily know whether or not a positional adjustment has been completed. Therefore, by making the adjustment so that either one of the pieces of position information pattern is detected, it is possible to perform a displaying operation on from one display screen to a plurality of display screens or separately display three-dimensional images without crosstalk.

The present invention makes it possible to use a high-definition wavelength plate filter in an optimal state at all times, so that a high-definition, highly realistic three-dimensional image can be viewed in an optimal state at all times. In addition, even in multiple screen display, image separation capability is increased, so that the viewer can enjoy viewing images on multiple screens without crosstalk between first and second images. Further, the setting of the position of the filter makes it possible to understand the principles of the three-dimensional image device, so that it can be used for enjoyable educational purposes; and it is not troublesome to fix the position of an image separating filter at the time of shipment.

A display device comprises an image display section for displaying image information at a first segment and a second segment, and is used along with a divided wavelength plate filter for rotating polarized light from the image information at the first segment in a direction that is different from the direction of polarized light from the image information at the second segment. The display device displays a position adjustment pattern having colors, figures, characters, symbols, diagrams, or designs or combinations thereof which differ from each other depending upon the segment when the relative positions of the image display section and the divided wavelength plate filter is to be adjusted.

In one form, the first segment and the second segment are divided into lines and alternately positioned.

In another form, the segments are divided horizontally or vertically.

In still another form, the display device comprises the divided wavelength plate filter and position adjusting means, the filter comprising a frame and being disposed close to the first and second segments of the image display section for rotating the polarized light from the image information at the first segment in a direction that is different from the direction of the polarized light from the image information at the second segment; and the position adjusting means acting upon the frame of the divided wavelength plate filter for adjusting the relative positions of the image display section and the divided wavelength plate filter.

In still another form, the first segment and the second segment are divided into lines and alternately positioned horizontally or vertically, and the divided wavelength plate filter has half wavelength plates that are formed to be located corresponding to the lines of the first segment or the lines of the second segment.

In still another form, the position adjusting means is capable of moving the frame in a direction substantially perpendicular to the borders of the lines of the half wavelength plates.

In still another form, the position adjusting means comprises a resilient member, mounted to the frame, and a threaded member for moving the frame towards and away from the resilient member by coming into contact with the frame.

In still another form, after positional adjustment, an image in accordance with parallax is displayed.

In still another form, after positional adjustment, an image for two screens is displayed as one image information.

A position adjustment pattern display program for displaying a position adjustment pattern for adjusting the position of a divided wavelength plate filter for rotating polarized light from image information at a first segment in a direction that is different from the direction of polarized light from image information at a second segment comprises a procedure for displaying the position adjustment pattern having colors, figures, characters, symbols, diagrams, or designs or combinations thereof which differ from each other depending on the segment.

A recording medium is capable of being subjected to a reading operation by a display device. In order to adjust the position of a divided wavelength plate filter for rotating polarized light from image information at a first segment in a direction that is different from the direction of polarized light from image information at a second segment, the recording medium stores a position adjustment pattern display program comprising a procedure for displaying a position adjustment pattern having colors, figures, characters, symbols, diagrams, or designs or combinations thereof which differ from each other depending on the segment.

Polarized glasses for viewing a display image through a divided wavelength plate filter for rotating polarized light from image information at a first segment of an image display section in a direction that is different from the direction of polarized light from image information at a second segment of the image display section is provided. The polarization directions of polarizing filters formed at lenses of both eyes are the same.

A method of adjusting the position of a filter of a display device which comprises an image display section for displaying image information at a first segment and a second segment is provided. A position adjustment pattern having colors, figures, characters, symbols, diagrams, or designs or combinations thereof which differ from each other depending on the segment is displayed on the image display section through a divided wavelength plate filter for rotating polarized light from image information at the first segment of the image display section in a direction that is different from the direction of polarized light from image information at the second segment of the image display section; the positional shift between the position adjustment pattern and the divided wavelength plate filter is detected in accordance with the state of the position adjustment pattern through the divided wavelength plate filter; and the relative positions of the image display section and the divided wavelength plate filter are adjusted in order to reduce the detected positional shift.

In one form of the method, the position adjustment pattern is automatically displayed on the image display section before image information in accordance with parallax or an image for two screens to be displayed as one image information.

In another form of the method, the display of the position adjustment pattern is viewed through polarized glasses in which the polarization directions of polarizing filters formed at lenses of both eyes are the same.

The invention claimed is:

1. A display device comprising:
    an image display section for displaying image information at a first segment and a second segment; and
    a divided wavelength plate filter for rotating polarized light from the image information at the first segment in a direction that is different from the direction of polarized light from the image information at the second segment, the divided wavelength plate filter being rotationally adjustable in a plane that is parallel to a display surface of the image display section;
    wherein the display device displays a position adjustment pattern having at least one of colors, figures, characters, symbols, diagrams, and designs, the position adjustment pattern varying to a viewer depending upon the relative positions of the image display section and the divided wavelength plate filter when the divided wavelength plate filter is adjusted.

2. A display device according to claim 1, wherein the first segment and the second segment are divided into lines and alternately positioned.

3. A display device according to claim 2, wherein the segments are divided horizontally or vertically.

4. A display device according to claim 1 comprising the divided wavelength plate filter and a position adjusting means, the filter comprising a frame and being disposed close to the first and second segments of the image display section for rotating the polarized light from the image information at the first segment in a direction that is different from the direction of the polarized light from the image information at the second segment; and the position adjusting means acting upon the frame of the divided wavelength plate filter for adjusting the relative positions of the image display section and the divided wavelength plate filter.

5. A display device according to claim 4, wherein the first segment and the second segment are divided into lines and alternately positioned horizontally or vertically, and wherein the divided wavelength plate filter has half wavelength plates that are formed to be located corresponding to the lines of the first segment or the lines of the second segment.

6. A display device according to claim 5, wherein the position adjusting means is capable of moving the frame in a direction substantially perpendicular to the borders of the lines of the half wavelength plates.

7. A display device according to claim 4, wherein the position adjusting means comprises a resilient member, mounted to the frame, and a threaded member for moving the frame towards and away from the resilient member by coming into contact with the frame.

8. A display device according to claim 1, wherein, after positional adjustment, an image in accordance with parallax is displayed.

9. A display device according to claim 1, wherein, after positional adjustment, an image for two screens is displayed as one image information.

10. A position adjustment pattern display program for displaying a position adjustment pattern for adjusting the position of a divided wavelength plate filter for rotating polarized light from image information at a first segment in a direction that is different from the direction of polarized light from image information at a second segment, the position adjustment pattern display program performing a method comprising the steps of:
    displaying the position adjustment pattern having at least one of colors, figures, characters, symbols, diagrams, and designs which vary to a viewer depending upon the relative positions of an image display section and the divided wavelength plate filter when the divided wavelength plate filter is adjusted,
    wherein the divided wavelength plate filter is rotationally adjustable in a plane that is parallel to a display surface of the image display section that displays the position adjustment pattern.

11. A recording medium which is capable of being subjected to a reading operation by a display device, wherein, in order to adjust the position of a divided wavelength plate filter for rotating polarized light from image information at a first segment in a direction that is different from the direction of polarized light from image information at a second segment, the recording medium stores a position adjustment pattern display program performing a method comprising the steps of:
    displaying a position adjustment pattern having at least one of colors, figures, characters, symbols, diagrams, and designs which vary to a viewer depending upon the relative positions of a display surface of the display device and the divided wavelength plate filter when the divided wavelength plate filter is adjusted,
    wherein the divided wavelength plate filter is rotationally adjustable in a plane that is parallel to the display surface of the display device that displays the position adjustment pattern.

12. Polarized glasses for viewing a display image through a divided wavelength plate filter for rotating polarized light from image information at a first segment of an image display section in a direction that is different from the direction of polarized light from image information at a second segment of an image display section of a display device,
  wherein the polarization directions of polarizing filters formed at lenses of both eyes are the same, and wherein the divided wavelength plate filter is rotationally adjustable in a plane that is parallel to a display surface of the display device that displays a position adjustment pattern, and
  wherein the display device displays the position adjustment pattern having at least one of colors, figures, characters, symbols, diagrams, and designs, the position adjustment pattern varying to a viewer depending upon the relative positions of the image display section and the divided wavelength plate filter when the divided wavelength plate filter is adjusted.

13. A method of adjusting the position of a filter of a display device which comprises an image display section for displaying image information at a first segment and a second segment, the method comprising the steps of:
  displaying a position adjustment pattern having at least one of colors, figures, characters, symbols, diagrams, and designs, which differ from each other depending on the first or second segment being visible, on the image display section through a divided wavelength plate filter for rotating polarized light from image information at the first segment of the image display section in a direction that is different from the direction of polarized light from image information at the second segment of the image display section;
  detecting the positional shift between the position adjustment pattern and the divided wavelength plate filter in accordance with the state of the position adjustment pattern through the divided wavelength plate filter; and
  adjusting the relative positions of the image display section and the divided wavelength plate filter in order to reduce the detected positional shift, the divided wavelength plate filter being rotationally adjustable in a plane parallel to a display surface of the display device that displays the position adjustment pattern.

14. A method of adjusting the position of a filter of a display device according to claim 13, wherein the position adjustment pattern is automatically displayed on the image display section before image information in accordance with parallax or an image for two screens to be displayed as one image information is displayed.

15. A method of adjusting the position of a filter of a display device according to claim 13, wherein the display of the position adjustment pattern is viewed through polarized glasses in which the polarization directions of polarizing filters formed at lenses of both eyes are the same.

* * * * *